United States Patent
Boeckman et al.

(10) Patent No.: US 7,499,536 B2
(45) Date of Patent: *Mar. 3, 2009

(54) APPARATUS AND METHOD FOR INTELLIGENT CALL ROUTING AND CALL RETURN

(75) Inventors: Michael W. Boeckman, Austin, TX (US); William E. Plunkett, Apex, NC (US)

(73) Assignee: AT&T Labs, Inc., Austin, TX (US)

( * ) Notice: Subject to any disclaimer, the term of this patent is extended or adjusted under 35 U.S.C. 154(b) by 136 days.

This patent is subject to a terminal disclaimer.

(21) Appl. No.: 10/936,553

(22) Filed: Sep. 9, 2004

(65) Prior Publication Data

US 2005/0031114 A1 Feb. 10, 2005

Related U.S. Application Data

(63) Continuation of application No. 09/645,325, filed on Aug. 25, 2000, now Pat. No. 6,850,600, which is a continuation of application No. 09/480,461, filed on Jan. 11, 2000, now Pat. No. 6,185,282, which is a continuation of application No. 08/829,235, filed on Mar. 31, 1997, now Pat. No. 6,075,853.

(51) Int. Cl.
*H04M 3/42* (2006.01)

(52) U.S. Cl. .............. 379/210.01; 379/45; 379/211.02; 379/221.14; 455/459; 455/460

(58) Field of Classification Search .............. 379/22.01, 379/114.24, 9.06, 45, 207.15, 230, 93.01, 379/100.09, 114.28, 211.02, 220.01, 29.06, 379/210.01; 455/456.1, 404.1, 459, 460, 455/433

See application file for complete search history.

(56) References Cited

U.S. PATENT DOCUMENTS

| | | | |
|---|---|---|---|
| 4,191,860 A | 3/1980 | Weber | |
| 4,310,726 A * | 1/1982 | Asmuth | 379/207.15 |
| 4,611,094 A | 9/1986 | Asmuth et al. | |
| 4,611,096 A | 9/1986 | Asmuth et al. | |
| 4,757,267 A * | 7/1988 | Riskin | 379/114.24 |
| 4,788,718 A | 11/1988 | McNabb et al. | |
| 4,797,818 A | 1/1989 | Cotter | |
| 4,893,325 A * | 1/1990 | Pankonen et al. | 379/45 |
| 4,905,273 A * | 2/1990 | Gordon et al. | 379/93.01 |
| 4,924,495 A | 5/1990 | Richards et al. | |

(Continued)

OTHER PUBLICATIONS

Berman et al., "Perspectives on the AIN Architecture," IEEE Communications Magazine, Feb. 1992, pp. 27-32.

Generic Requirements for GetData (Bellcore GR-2838-CORE, issue 1, Aug. 1994).

"ISDN Call Forwarding", Bell Communications Research, Technical Reference TR-TSY-000853, Revision 1 (Dec. 1993).

(Continued)

*Primary Examiner*—Fan Tsang
*Assistant Examiner*—Md S Elahee
(74) *Attorney, Agent, or Firm*—Greenblum & Bernstein, P.L.C.

(57) ABSTRACT

A computer program for routing a service call from a calling party to a service network having a plurality of service network locations, the program stored in a computer-readable medium. The program includes receiving a service call request to connect the calling party to one of the service network locations, determining a location of the calling party by searching a Number Plan Area (NPA) table to determine an NPA of the calling number of the calling party, identifying one of the service network locations for receiving the service call request, and identifying routing information for routing the service call request to the receiving service network location, and completing the service call request to the receiving service network location.

12 Claims, 10 Drawing Sheets

U.S. PATENT DOCUMENTS

| | | | |
|---|---|---|---|
| 5,084,816 A | 1/1992 | Boese et al. | |
| 5,095,505 A | 3/1992 | Finucane et al. | |
| 5,136,636 A | 8/1992 | Wegrzynowicz | |
| 5,247,571 A | 9/1993 | Kay et al. | |
| 5,249,223 A | 9/1993 | Vanacore | |
| 5,311,569 A * | 5/1994 | Brozovich et al. | 379/45 |
| 5,311,572 A | 5/1994 | Freides et al. | |
| 5,353,331 A | 10/1994 | Emery et al. | |
| 5,481,603 A | 1/1996 | Gutierez et al. | |
| 5,506,897 A | 4/1996 | Moore et al. | |
| 5,524,146 A | 6/1996 | Morissey et al. | |
| 5,533,107 A | 7/1996 | Irwin | |
| 5,537,470 A | 7/1996 | Lee | |
| 5,546,445 A | 8/1996 | Dennison et al. | |
| 5,559,878 A | 9/1996 | Keys et al. | |
| 5,572,579 A | 11/1996 | Orriss et al. | |
| 5,579,368 A * | 11/1996 | van Berkum | 379/9.06 |
| 5,586,177 A | 12/1996 | Farris et al. | |
| 5,588,048 A | 12/1996 | Neville | |
| 5,592,541 A | 1/1997 | Fleischer, III et al. | |
| 5,610,977 A | 3/1997 | Williams et al. | |
| 5,680,446 A | 10/1997 | Fleischer, III et al. | |
| 5,696,809 A * | 12/1997 | Voit | 379/22.01 |
| 5,712,900 A * | 1/1998 | Maupin et al. | 455/433 |
| 5,734,709 A | 3/1998 | De Witt et al. | |
| 5,771,283 A | 6/1998 | Chang et al. | |
| 5,797,093 A * | 8/1998 | Houde | 455/404.1 |
| 5,799,061 A | 8/1998 | Melcher et al. | |
| 5,799,073 A | 8/1998 | Fleischer, III et al. | |
| 5,805,688 A | 9/1998 | Gillespie et al. | |
| 5,805,689 A | 9/1998 | Neville | |
| 5,812,639 A | 9/1998 | Bartholomew et al. | |
| 5,848,142 A | 12/1998 | Yaker | |
| 5,852,809 A | 12/1998 | Abel et al. | |
| 5,867,570 A | 2/1999 | Bargout et al. | |
| 5,878,127 A | 3/1999 | Fleischer, III et al. | |
| 5,901,214 A | 5/1999 | Shaffer et al. | |
| 5,920,618 A | 7/1999 | Fleischer, III et al. | |
| 5,963,861 A * | 10/1999 | Hanson | 455/456.1 |
| 5,974,132 A | 10/1999 | Ricciardi et al. | |
| 5,974,133 A | 10/1999 | Fleischer, III et al. | |
| 6,075,853 A | 6/2000 | Boeckman et al. | |
| 6,084,872 A | 7/2000 | Munson et al. | |
| 6,097,802 A | 8/2000 | Fleischer, III et al. | |
| 6,108,408 A | 8/2000 | Plunkett et al. | |
| 6,115,553 A | 9/2000 | Iwamoto | |
| 6,154,535 A | 11/2000 | Velamuri et al. | |
| 6,185,282 B1 | 2/2001 | Boeckman et al. | |
| 6,185,289 B1 | 2/2001 | Hetz et al. | |
| 6,188,751 B1 | 2/2001 | Scherer | |
| 6,205,214 B1 | 3/2001 | Culli | |
| 6,229,888 B1 | 5/2001 | Miloslavsky | |
| 6,330,324 B1 | 12/2001 | Sabinson et al. | |
| 6,332,022 B1 | 12/2001 | Martinez | |
| 6,381,324 B1 | 4/2002 | Shaffer et al. | |
| 6,411,699 B1 | 6/2002 | Fleischer, III et al. | |
| 6,526,136 B2 | 2/2003 | Plunkett et al. | |
| 6,542,598 B2 | 4/2003 | Fleischer, III et al. | |
| 6,563,917 B2 | 5/2003 | Sabinson et al. | |
| 6,697,477 B2 * | 2/2004 | Fleischer et al. | 379/211.02 |
| 2002/0057780 A1 | 5/2002 | Gruchala et al. | |
| 2003/0161457 A1 | 8/2003 | Sabinson et al. | |

OTHER PUBLICATIONS

"Accessline Technologies Announces Licensing of Patent to Ericcson", Accessline Technologies, Inc., News Release Jun. 5, 1996, pp. 1-2.

"Seven-Digit Number Reaches a Business Anywhere in the Southeast", BellSouth Business Systems, Inc., New Release Jan. 30, 1995, pp. 1-3.

"Simplicity Key to ZipCONNECT[SM] Service", BellSouth Business Systems, News Release Jun. 1995, pp. 1-2.

Telecommunications Research Associates, "Understanding SS7, AIN and LNP", pp. 5-2 through 5-20 (Jul. 1998).

* cited by examiner

APPARATUS AND METHOD FOR INTELLIGENT CALL ROUTING AND CALL RETURN

This is a continuation of U.S. patent application Ser. No. 09/645,325, filed Aug. 25, 2000 now U.S. Pat. No. 6,850,600, which is a continuation of U.S. patent application Ser. No. 09/480,461, filed Jan. 11, 2000, (now U.S. Pat. No. 6,185,282, issued Feb. 6, 2001) which is a continuation of U.S. patent application Ser. No. 08/829,235, filed Mar. 31, 1997, (now U.S. Pat. No. 6,075,853, issued Jun. 13, 2000), the contents of which are expressly incorporated by reference herein in its entirety.

BACKGROUND OF THE INVENTION

1. Field of the Invention

The present invention generally relates to the field of telecommunications. More particularly, the present invention relates to a telecommunications network environment having intelligent call routing and call return capabilities for routing service calls, such as emergency or poison assistance calls, to an appropriate service or control center.

2. Acronyms

The written description provided herein contains acronyms which refer to various telecommunications services, components and techniques, as well as features relating to the present invention. Although some of these acronyms are known, use of these acronyms is not strictly standardized in the art. For purposes of the written description herein, acronyms will be defined as follows:

10-Digit (10D)
Action Control Point. (ACP)
Advanced Intelligent Network (AIN)
Common Channel Signaling (CCS)
Central Office (CO)
Call Processing Record (CPR)
Data and Reporting System (DRS)
End Office (EO)
Integrated Service Control Point (ISCP)
Integrated Services Digital Network (ISDN)
Multi-Frequency (MF)
Number Plan Area (NPA)
Central Office Code (NXX)
Poison Control Answering Point (PCAP)
Poisoned Party Number (PPN)
Primary Rate Interface (PRI)
Public Service Answering Point (PSAP)
Service Creation Environment (SCE)
Service Control Point (SCP)
Service Management System (SMS)
Signaling System 7 (SS7)
Service Switching Point (SSP)
Signaling Transfer Point (STP)
Terminating Attempt Trigger (TAT)
Transaction Capabilities Applications Part (TCAP)
Transmission Control Protocol/Internet Protocol (TCP/IP)

3. Background Information

In recent years, a number of new telephony service features have been implemented and provided by an Advanced Intelligent Network (AIN). The AIN evolved out of a need to increase the capabilities of the existing telephone network architecture and meet the growing needs of telephony customers. The AIN architecture generally comprises two networks, a data messaging network and a trunked communications network. The trunked communications network handles voice and data communications between dispersed network locations, whereas the data messaging network is provided for controlling operations of the trunked communications network.

An illustration of the basic components of an AIN network environment is shown in FIG. 1, which is provided to facilitate communication between a plurality of network locations or stations 72-86. As shown in FIG. 1, Central Offices (COs) 64-70 are provided for sending and receiving data messages from a Service Control Point (SCP) 56 via one or more Signaling Transfer Points (STPs) 51, 53 and 59. The data messages are communicated to and from the COs 64-70 and the SCP 56 along a Common Channel Signaling (CCS) network 88. Each CO 64-70 serves as a network Service Switching Point (SSP) to route telephone calls between a calling station (e.g., station 72) and a called station (e.g., station 84) through the trunked communications network 90-93.

Additional information regarding AIN and AIN-related network environments, see Berman, Roger K., and Brewster, John H., "Perspectives on the AIN Architecture," IEEE Communications Magazine, February 1992, pp. 27-32, the disclosure of which is expressly incorporated herein by reference in its entirety.

A number of features provided by prior AIN or AIN-type intelligent networks relate to specialized call processing of incoming calls. For example, U.S. Pat. Nos. 4,611,094 and. 4,611,096, both to ASMUTH et al., disclose a system for providing custom incoming telephone call processing services to a subscriber operating at geographically diverse locations. A subscriber program stored in a central database is accessed to provide instructions to the SSPs to complete incoming calls to one of the subscriber locations in accordance with special services defined by the subscriber. The subscriber program controls the Action Control Points (ACPs) to string together the desired call processing capabilities to process each call. Specified parameters stored in the program, such as time of day, caller location, and data inputted by the caller may be utilized to determine the final destination to which each call should be completed.

U.S. Pat. No. 4,788,718, to McNABB, discloses centralized recording of call traffic information. The system provides a data gathering and recording function to the centralized database which stores the subscriber's call routing program. The subscriber's call routing program performs several functions, including presenting various announcements to callers, prompting callers for inputting information digits and collecting the resulting information digits, routing the call to a number provided by the subscriber, and performing final call dispositions other than routing to the telephone number provided by the subscriber. Processing of the call traffic information dynamically changes the subscriber's call routing program to reduce the number of blocked calls to the subscriber's telephone numbers.

U.S. Pat. No. 5,247,571, to KAY et al., discloses an Area Wide Centrex system to provide specialized calling features to stations connected to a plurality of central offices. Each of the central office switching points connects to a number of local telephone lines. The features are extended to the local telephone lines by taking the programming intelligence out of the central offices and moving it into a database located at a centralized location, such as an SCP. Service features are, controlled by the central database and are changed by reprogramming the service logic located at the central database. A variety of service features are provided including a work at home service that enables a user of a private network access from a home telephone and access authorization to increase the security of the private network.

U.S. Pat. No. 5,353,331, to EMERY et al., discloses an AIN system which connects to, and controls processing of, calls to a subscriber's wireless handset via a home base station or wireless communication network. In response to calls directed to the subscriber's wireless handset, the AIN determines where the handset is located using a central database and routes the call to that location. The incoming call can be routed directly to the handset, blocked, or routed to an alternate termination point. In response to calls from the handset, the central database provides data instructions to the landline network to extend a requested special service to the subscriber.

U.S. Pat. No. 5,592,541, to FLEISCHER, III et al., discloses an AIN network environment for forwarding incoming calls by utilizing a subscriber defined routing list. The routing list may comprise alternate telephone numbers to which calls placed to the subscriber's number(s) will be routed. The routing lists may be defined for forwarding incoming calls to other numbers for either all of the numbers or for selected groups of one or more numbers. Incoming calls may also be routed according to the time-of-day, day-of-week, percentage allocation, specific date, originating location of calling party, or calling party selection.

While prior AIN or AIN-type intelligent network applications have provided various call forwarding and routing features as indicated above, such prior attempts have not provided intelligent call routing capabilities for routing service calls to predetermined service or control centers. For instance, with the development of emergency and poison assistance control centers by state and local governments, there is an increasing need to provide intelligent call routing capabilities to facilitate the handling and routing of emergency or poison assistance calls, so that calls may be directed to the most appropriate or nearest control center. It would be desirable, for example, to provide an intelligent network environment that is capable of routing calls based on the location of the calling party and the availability of designated service or control centers. Prior attempts have also not provided system flexibility in terms of providing various routing and/or call return options that may be combined with routing based on the location of the calling party.

Such features would be highly desirable for service or control centers that provide assistance to individuals or members of the general public who dial a single publicized telephone number. With intelligent routing capabilities, calls could be automatically directed to the most appropriate control or service center, without requiring additional information or assistance from the calling party. Further, with flexible routing options, calls could be routed away from understaffed or closed centers (e.g., based on the time-of-day, day-of-week, percentage allocation, etc.) so that reliable service or assistance may be provided to end users.

SUMMARY OF THE PRESENT INVENTION

In view of the above, the present invention, through one or more of its various aspects and/or embodiments is thus presented to accomplish one or more objectives and advantages, such as those noted below.

A general object of the present invention is to provide intelligent call routing and call return features in an Advanced Intelligent Network (AIN) or AIN-type network environment. In particular, an object of the present invention is to provide intelligent call routing and call return capabilities for routing service calls to predetermined service or control centers.

Another object of the invention is to provide intelligent call routing capabilities to facilitate the handling and routing of emergency or poison assistance calls, so that calls may be directed to the most appropriate or nearest control center. An object of the invention is to route calls based on, for example, the NPA-NXX of the calling party.

Still another object of the present invention is to provide an intelligent network environment that is capable of routing calls based on the location of the calling party and the availability of designated service or control centers.

Another object of the invention is to provide an apparatus and method that has flexibility in terms of providing various routing and/or call return options that may be combined with routing based on the location of the calling party. An object of the invention is to automatically route calls away from understaffed or closed centers (e.g., based on the time-of-day, day-of-week, percentage allocation, etc.) so that reliable service or assistance may be provided to end users.

Yet another object of the invention is to provide intelligent call routing and call return features for service or control centers that provide assistance to individuals or members of the general public who dial a single publicized telephone number. An object of the invention is to automatically direct or route service calls to the most appropriate control or service center, without requiring additional information or assistance from the calling party.

According to an aspect of the present invention, intelligent call routing and call return capabilities are provided in an Advanced Intelligent Network (AIN) or AIN-type network environment. The intelligent call routing features of the present invention are adapted for routing service calls (e.g., emergency or poison assistance calls) to an appropriate service or control center (e.g., a Poison Control Answering Point (PCAP)), in accordance with the location of the calling party and one or more routing options. For example, the Number Plan Area (NPA) and Central Office Code (NXX) of the calling party's telephone number may be analyzed in order to determine where to route the call. In addition, other routing features may be provided to facilitate handling of the call. For instance, calls may be routed according to the time-of-day and/or day-of-week, and recorded announcements may be provided to indicate when a particular service call cannot be completed. The routing features of the present invention may also be combined with the intelligent call return capabilities, for returning the service call over the network to a location from which the call was transferred (e.g., to a 911 operator located at a Public Service Answering Point (PSAP)).

According to one aspect of the present invention, an intelligent call routing method is provided for routing a service call from a calling party to a service network comprising a plurality of interconnected service switching points and a plurality of service network locations, each of the service network locations being connected by a communication line to one of the plurality of service switching points, each of the service switching points being connected by a signaling communication system to a service control point, the signaling communication system providing communication of data messages between the service switching points and the service control point. The method may comprise: receiving, at one of the service switching points, a service call request to connect the calling party to one of the service network locations; sending, in response to the request, a query message from the one of the service switching points to the service control point over the signaling communication system; determining, at the service control point, a location of the calling party based on a calling number of the calling party; identifying, based on the location of the calling party, one of the service network locations for receiving the service call request, and identifying routing information for routing the service call request to the receiving service network location; sending, from the service control point, a response message over the signaling communication system to the querying service switching point, the response message including the routing information; and completing, in response to receiving the response message, the service call request to the receiving service network location based on the routing information.

In the intelligent call routing method of the invention, the location of the calling party may be determined based on an Number Plan Area (NPA) and a Central Office Code (NXX) of the calling number of the calling party. Further, the service control point may comprise a service network location number table including a plurality of NPA-NXX entries and a number identifying the service network locations that correspond to each of the NPA-NXX entries, and in the method of the invention the NPA and NXX of the calling number of the calling party may be compared to each of the NPA-NXX entries in the service network location number table in order to determine a number identifying the receiving service network location that corresponds to the NPA and NXX of the calling number of the calling party. The service control point may further comprise a route table comprising a plurality of entries containing a route index and an outpulse number for routing service call requests to each of the service network locations, whereby a route index and an outpulse number are determined from the route table based on the number identifying the receiving service network location. In such a case, the route index and the outpulse number can be included as part of the routing information contained in the response message from the service control point.

In the intelligent call routing method of the present invention, the service call request may be initiated from the location of the calling party by dialing a predefined emergency assistance number (e.g., "911"). The service call request may be received at a 911 tandem switch in response to the predefined emergency assistance number being dialed and, thereafter, the service call request may be transferred from the 911 tandem switch to the one of the service switching points.

In addition, according to the intelligent call routing method of the invention, the service control point may further comprise a routing options table having a plurality of entries containing numbers identifying alternate service network locations to route a service call request according to predetermined routing options, such that in the method of the invention the routing options table is searched to determine if the service call request should be routed to an alternate service network location based on the predetermined routing options. The predetermined routing options may comprise routing options to route to an alternate service network location based on at least one of a time-of-day and a day-of-week.

In the intelligent call routing method of the invention, the service control point may further comprise a NPA table comprising a plurality of entries indicating an NPA corresponding to each combination of an incoming trunk line number and an NPA code. The query message that is sent to the service control point may include the NXX of the calling number of the calling party, as well as an incoming trunk line number and an NPA code associated with the calling number. According to the method of the invention, the NPA table may be searched to determine the NPA of the calling number based on the incoming trunk line number and the NPA code contained in the query message.

In the intelligent call routing method of the present invention, the service network may comprise a poison control service network and the service network locations may comprise poison control answering points (PCAPs) that are adapted to provide assistance and counseling to calling parties that have been poisoned. Further, the poison control service network may comprise a Primary Rate Interface (PRI) network for interconnecting the service switching points, and the service control point may be implemented as an Integrated Service Control Point (ISCP).

According to another aspect of the present invention, an intelligent call return routing method may be provided for returning a service call placed to a service network by a calling party to one of a plurality of service answering points, the service network comprising a plurality of interconnected service switching points and a plurality of service network locations, each of the service network locations being connected by a communication line to one of the plurality of service switching points, each of the service switching points being connected by a signaling communication system to a service control point, the signaling communication system providing communication of data messages between the service switching points and the service control point. The method may comprise: initiating, at one of the service network locations, a call return request to return the service call of the calling party to one of the service answering points; receiving, at one of the service switching points, the call return request from the one of the service network locations; sending, in response to the call return request, a query message from the one of the service switching points to the service control point over the signaling communication system; determining, at the service control point, a location of the calling party based on a calling number of the calling party; identifying, based on the location of the calling party, of the service answering points for receiving the call return request, and identifying routing information for routing the call return request to the receiving service answering point; sending, from the service control point, a response message to the querying service switching point, the response message including the routing information; and completing, in response to receiving the response message, the call return request to the receiving service answering point based on the routing information.

In the intelligent call return routing method, it may be determined when the call return request can be routed locally to the receiving service answering point by the querying service switching point and determined when the call return request must be routed remotely to the receiving service answering point by the querying service switching point. Local routing information may be identified and included as part of the routing information when it is determined that local routing can be performed, and remote routing information may be identified and included as part of the routing information when it is determined that remote routing must be performed. The local routing information may comprise a route index and a predefined emergency assistance number to be outpulsed. The emergency assistance number may comprise "911", and the route index may identify a communication line connecting the querying service switching point to a 911 tandem switch serving the receiving service answering point.

For remote call return routing, the remote routing information may comprise a route index and a predefined virtual number to be outpulsed. In addition, the intelligent call return method may further comprise: routing the service call over the service network from the querying service switching point to a remote service switching point based on the route index and the number contained in the routing information; sending, in response to the service call be routed to the remote service switching point, another query message to the service control point over the signaling communication system; identifying additional routing information for routing the call return request to the receiving service answering point from the remote service switching point; sending, from the service control point, another response message to the remote service switching point, the response message including the additional routing information; and routing, in response to receiving the another response message, the call return request to the receiving service answering point based on the additional routing information.

In the intelligent call return routing method of the present invention, the location of the calling party may be determined from the NPA and NXX of the calling number of the calling party. In addition, the service control point may comprise a stand-alone table for each of the service switching points, wherein each of the stand-alone tables includes a plurality of NPA-NXX entries, each of the NPA-NXX entries including a corresponding number to be outpulsed for routing the call return request to the receiving service answering point based on the NPA and the NXX of the calling party.

In the intelligent call return routing method of the present invention, the service network may comprise a poison control service network and the service network locations may comprise poison control answering points (PCAPs) that are adapted to provide assistance and counseling to calling parties that have been poisoned. Further, the poison control service network may comprise a Primary Rate Interface (PRI) network for interconnecting the service switching points, and the service control point may be implemented as an Integrated Service Control Point (ISCP).

According to still another aspect of the present invention, a method may be provided for routing a service call placed to a poison control service network by a calling party, the poison control service network comprising a plurality of interconnected service switching points and a plurality of service network locations, each of the service network locations being connected by a communication line to one of the plurality of service switching points, the service network locations comprise poison control answering points that are adapted to provide assistance and counseling to calling parties that have been poisoned, each of the service switching points being connected by a signaling communication system to a service control point, the signaling communication system providing communication of data messages between the service switching points and the service control point. The method may comprise: initiating the service call request, from a location of the calling party, by dialing a predefined emergency assistance number; receiving the service call request at a 911 tandem switch in response to the predefined emergency assistance number being dialed, and transferring the service call request from the 911 tandem switch to one of the service switching points over a communication line; receiving, at the one of the service switching points, the service call request to connect the calling party to one of the service network locations; sending, in response to the request, a query message from the one of the service switching points to the service control point over the signaling communication system; determining, at the service control point, the location of the calling party based on a calling number of the calling party; identifying, based on the location of the calling party, one of the service network locations for receiving the service call request, and identifying routing information for routing the service call request to the receiving service network location; sending, from the service control point, a response message over the signaling communication system to the querying service switching point, the response message including the routing information; and completing, in response to receiving the response message, the service call request to the receiving service network location based on the routing information.

In order to facilitate call return requests, the method of the present invention for routing a service call may further comprise: initiating, at the receiving service network locations, a call return request to return the service call of the calling party to one of a plurality of service answering points; receiving, at one of the service switching points, the call return request from the receiving service network location; sending, in response to the call return request, a query message from the one of the service switching points to the service control point over the signaling communication system; determining, at the service control point, the location of the calling party based on the calling number of the calling party; identifying, based on the location of the calling party, one of the service answering points for receiving the call return request, and identifying routing information for routing the call return request to the receiving service answering point; sending, from the service control point, a response message to the querying service switching point, the response message including the routing information; and completing, in response to receiving the response message, the call return request to the receiving service answering point based on the routing information.

According to another aspect of the invention, an intelligent call routing system is provided for routing a service call from a calling party to a service network comprising a plurality of interconnected service switching points and a plurality of service network locations, each of the service network locations being connected by a communication line to one of the plurality of service switching points, each of the service switching points being connected by a signaling communication system to a service control point, the signaling communication system providing communication of data messages between the service switching points and the service control point. The system may comprise: a receiving system for receiving, at one of the service switching points, a service call request to connect the calling party to one of the service network locations; a sending system for sending, in response to the request, a query message from the one of the service switching points to the service control point over the signaling communication system; a determining system for determining, at the service control point, a location of the calling party based on a calling number of the calling party; an identifying system for identifying, based on the location of the calling party, one of the service network locations for receiving the service call request, and identifying routing information for routing the service call request to the receiving service network location; a sending system for sending, from the service control point, a response message over the signaling communication system to the querying service switching point, the response message including the routing information; and a completing system for completing, in response to receiving the response message, the service call request to the receiving service network location based on the routing information.

In the intelligent call routing system of the invention, the determining system may comprises means for determining the location of the calling party based on an Number Plan Area (NPA) and a Central Office Code (NXX) of the calling number of the calling party. Further, the service control point may comprise a service network location number table including a plurality of NPA-NXX entries and a number identifying the service network locations that correspond to each of the NPA-NXX entries, wherein the intelligent call routing system further comprises a system for comparing the NPA and NXX of the calling number of the calling party to each of the NPA-NXX entries in the service network location number table to determine a number identifying the receiving service network location that corresponds to the NPA and NXX of the calling number of the calling party.

The service control point may also include a route table comprising a plurality of entries containing a route index and an outpulse number for routing service call requests to each of the service network locations, wherein the system for identifying routing information comprises means for determining a route index and an outpulse number from the route table based on the number identifying the receiving service network location. The route index and the outpulse number may be included as part of the routing information in the response message from the service control point.

In the intelligent call routing system, the service control point may further comprise a routing options table comprising a plurality of entries containing numbers identifying alternate service network locations to route a service call request according to predetermined routing options. A system may also be provided for searching the routing options table to determine if the service call request should be routed to an alternate service network location based on the predetermined routing options. The predetermined routing options may comprise routing options to route to an alternate service network location based on at least one of a time-of-day and a day-of-week.

The service control point may also include an NPA table comprising a plurality of entries indicating an NPA corresponding to each combination of an incoming trunk line number and an NPA code. Further, the query message may include the NXX of the calling number of the calling party and an incoming trunk line number and an NPA code associated with the calling number. The determining system of the invention may comprise means for searching the NPA table to determine the NPA of the calling number based on the incoming trunk line number and the NPA code contained in the query message.

According to yet another aspect of the invention, an intelligent call return routing system is provided for returning a service call placed to a service network by a calling party to one of a plurality of service answering points, the service network comprising a plurality of interconnected service switching points and a plurality of service network locations, each of the service network locations being connected by a communication line to one of the plurality of service switching points, each of the service switching points being connected by a signaling communication system to a service control point, the signaling communication system providing communication of data messages between the service switching points and the service control point. The system may comprise: an initiating system for initiating, at one of the service network locations, a call return request to return the service call of the calling party to one of the service answering points; a receiving system for receiving, at one of the service switching points, the call return request from the one of the service network locations; a sending system for sending, in response to the call return request, a query message from the one of the service switching points to the service control point over the signaling communication system; a determining system for determining, at the service control point, a location of the calling party based on a calling number of the calling party; an identifying system for identifying, based on the location of the calling party, one of the service answering points for receiving the call return request, and identifying routing information for routing the call return request to the receiving service answering point; a sending system for sending, from the service control point, a response message to the querying service switching point, the response message including the routing information; and a completing system for completing, in response to receiving the response message, the call return request to the receiving service answering point based on the routing information.

In the intelligent call return routing system, a system may also be provided for determining when the call return request can be routed locally to the receiving service answering point by the querying service switching point and when the call return request must be routed remotely to the receiving service answering point by the querying service switching point. A system may also be provided for identifying local routing information to be included as part of the routing information when it is determined that local routing can be performed, and identifying remote routing information to be included as part of the routing information when it is determined that remote routing must be performed. The local routing information may comprise a route index and a predefined emergency assistance number to be outpulsed, and the intelligent call return routing system may further comprise a system for returning the service call to the receiving service answering point from the querying service switching point based on the route index and the emergency assistance number contained in the routing information. The emergency assistance number may comprise "911", and the route index may identify a communication line connecting the querying service switching point to a 911 tandem switch serving the receiving service answering point.

According to the intelligent call return routing system, the remote routing information may comprise a route index and a predefined virtual number to be outpulsed. For, in order to facilitate remote call return routing, the system may further comprise: a routing system for routing the service call over the service network from the querying service switching point to a remote service switching point based on the route index and the virtual number contained in the routing information; a sending system for sending, in response to the service call be routed to the remote service switching point, another query message to the service control point over the signaling communication system; an identifying system for identifying additional routing information for routing the call return request to the receiving service answering point from the remote service switching point; a sending system for sending, from the service control point, another response message to the remote service switching point, the response message including the additional routing information; and a routing system for routing, in response to receiving the another response message, the call return request to the receiving service answering point based on the additional routing information.

According to an aspect of the intelligent call return routing system, the determining system may comprise means for determining the location of the calling party based on an Number Plan Area (NPA) and a Central Office Code (NXX) of the calling number of the calling party, and the query message from the querying service switching point may include the NPA and the NXX of the calling number of the calling party. The service control point also may include a stand-alone table for each of the service switching points, wherein each of the stand-alone tables includes a plurality of NPA-NXX entries, each of the NPA-NXX entries including a corresponding number to be outpulsed for routing the call return request to the receiving service answering point.

In the intelligent call return routing system of the present invention, the service network may comprise a poison control service network and the service network locations may comprise poison control answering points (PCAPs) that are adapted to provide assistance and counseling to calling parties that have been poisoned. Further, the poison control service network may comprise a Primary Rate Interface (PRI) network for interconnecting the service switching points, and the service control point may be implemented as an Integrated Service Control Point (ISCP).

According to a further aspect of the invention, a system may be provided for routing a service call placed to a poison control service network by a calling party, the poison control service network comprising a plurality of interconnected service switching points and a plurality of service network locations, each of the service network locations being connected by a communication line to one of the plurality of service switching points, the service network locations comprise poison control answering points that are adapted to provide assistance and counseling to calling parties that have been poisoned, each of the service switching points being connected by a signaling communication system to a service control point, the signaling communication system providing communication of data messages between the service switching points and the service control point. The system may comprise: an initiating system for initiating the service call request, from a location of the calling party, by dialing a predefined emergency assistance number; a receiving system for receiving the service call request at a 911 tandem switch in response to the predefined emergency assistance number being dialed, and transferring the service call request from the 911 tandem switch to one of the service switching points over a communication line; a receiving system for receiving, at the one of the service switching points, the service call request to connect the calling party to one of the service network locations; a sending system for sending, in response to the request, a query message from the one of the service switching points to the service control point over the signaling communication system; a determining system for determining, at the service control point, the location of the calling party based on a calling number of the calling party; an identifying system for identifying, based on the location of the calling party, one of the service network locations for receiving the service call request, and identifying routing information for routing the service call request to the receiving service network location; a sending system for sending, from the service control point, a response message over the signaling communication system to the querying service switching point, the response message including the routing information; and a completing system for completing, in response to receiving the response message, the service call request to the receiving service network location based on the routing information.

The system for routing a service call may also facilitate call return requests and, as such, may further comprise: an initiating system for initiating, at the receiving service network locations, a call return request to return the service call of the calling party to one of a plurality of service answering points; a receiving system for receiving, at one of the service switching points, the call return request from the receiving service network location; a sending system for sending, in response to the call return request, a query message from the one of the service switching points to the service control point over the signaling communication system; a determining system for determining, at the service control point, the location of the calling party based on the calling number of the calling party; an identifying system for identifying, based on the location of the calling party, one of the service answering points for receiving the call return request, and identifying routing information for routing the call return request to the receiving service answering point; a sending system for sending, from the service control point, a response message to the querying service switching point, the response message including the routing information; and a completing system for completing, in response to receiving the response message, the call return request to the receiving service answering point based on the routing information.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein.

DETAILED DESCRIPTION OF THE PREFERRED EMBODIMENTS

Referring to the accompanying drawings, a detailed description of the preferred embodiments, features and aspects of the present invention will be provided.

The present invention relates to an apparatus and method for providing intelligent call routing and call return capabilities in a telecommunications network environment. The intelligent call routing features of the present invention may be utilized for routing service calls to an appropriate service or control center, in accordance with one or more routing options. The routing features of the present invention may also be combined with the call return capabilities, for returning the service call over the network to an appropriate location. By way of a non-limiting example, the present invention may be utilized for routing public service calls, such as emergency or poison assistance calls, to one of a plurality of service or control centers depending upon the location of the calling party (i.e., the poisoned party). For purposes of illustration, the various features and aspects of the present invention are described herein with reference to an exemplary poison control service network, that provides counseling and emergency assistance to the public. P However, the present invention is not limited to such applications, and may be implemented to provide intelligent call routing and call return features in other network environments and applications (e.g., alcohol and substance abuse counseling, crisis intervention, health and human services, disaster relief, and other types of service or counseling networks).

According to an aspect of the present invention, service calls may be routed to an appropriate service or control center based on the location of the calling party. Various methods and techniques may be utilized to determine the location of the calling party. For example, the Number Plan Area (NPA) and Central Office Code (NXX) of the calling party's telephone number may be analyzed in order to determine where to route the call. In addition to routing the call based on the NPA-NXX of the calling party, other routing features or options may be provided to facilitate handling of the call. For instance, calls may be routed according to the time-of-day and/or day-of-week, and recorded announcements may be provided to indicate when a particular service call cannot be completed.

As discussed further below, the various features of the present invention may be implemented through the use of an Advanced Intelligent Network (AIN) that provides centralized control of telephony services, as opposed to localized control of services at the Central Office (CO) or End Office (EO). Such an AIN system is provided through interaction between switching points and other systems supporting AIN logic and functionality. Other types of intelligent network environments may also be provided to implement the various features of the present invention, as disclosed herein.

Figure 1:
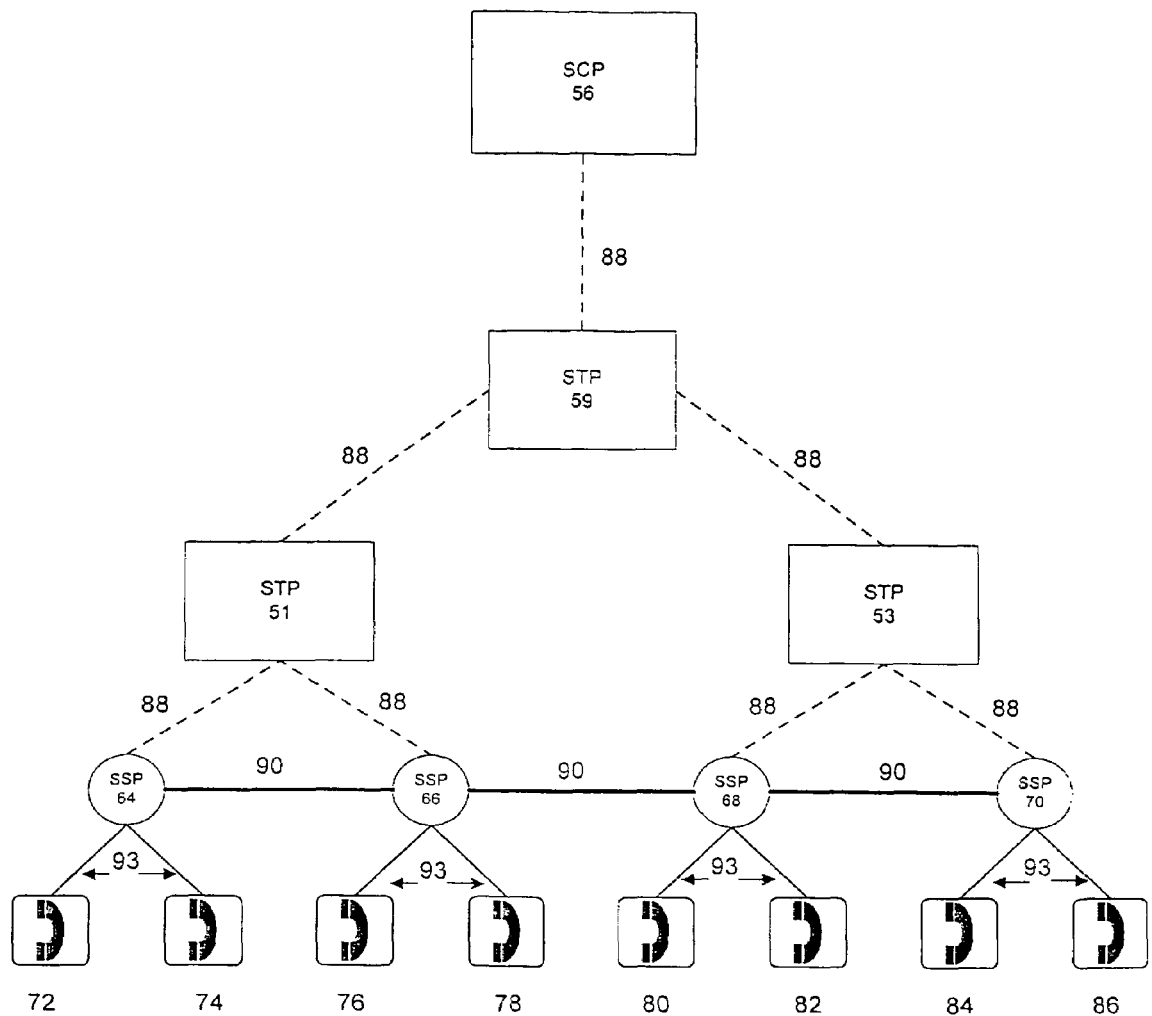
FIG. 1 illustrates the components of a conventional Advanced Intelligent Network (AIN) network environment.
Figure 2:
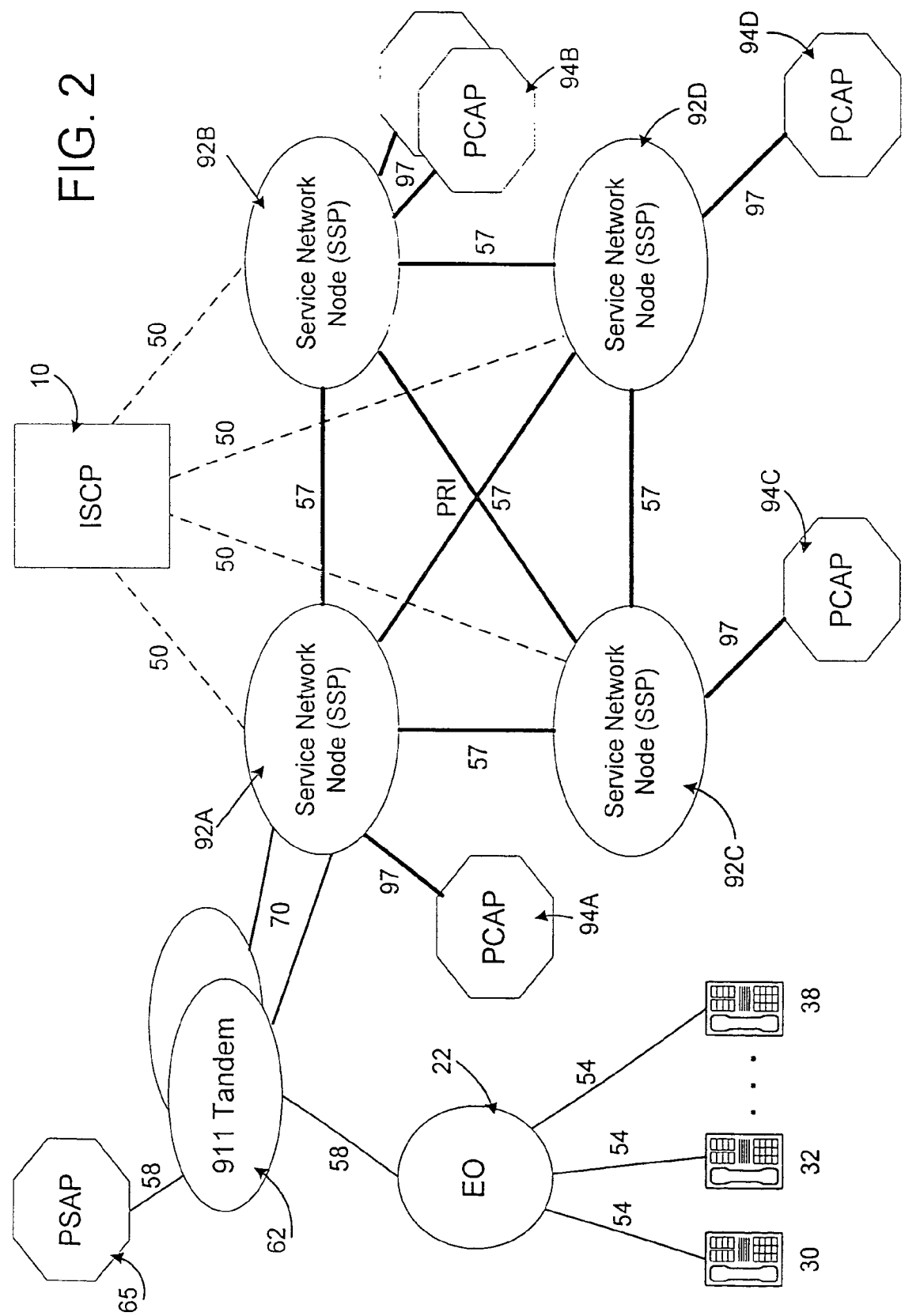
FIG. 2 is a block diagram of an exemplary AIN network environment for supporting the intelligent call routing and call return features of the present invention.

In accordance with an aspect of the present invention, FIG. 2 illustrates a general block diagram of an exemplary AIN network environment for supporting the intelligent call routing and call return features of the invention. In the block diagram of FIG. 2, a poison control service network is illustrated that comprises a plurality of service network nodes 92A-92D that are interconnected by a communication network, such as an Integrated Digital Services Network (ISDN) or a fully meshed Primary Rate Interface (PRI) backbone network 57. The exemplary poison control service network of FIG. 2 may be established, for example, by a local or state government, and may include centers that specialize in the handling of emergency calls from individuals who may require the assistance of poison specialists. For this purpose, Poison Control Answering-Points (PCAP) 94A-94D may be provided at geographically dispersed locations and may comprise poison assistance service or control centers for handling service calls. Each of the PCAP locations 94A-94D may be connected to one of the service network nodes 92A-92D by a communication link 97. Communication link 97 may comprise, for example, a PRI link. As indicated above, while the embodiment of FIG. 2 is disclosed with reference to a poison control service network, the intelligent routing and call return features of the present invention may be utilized in other types of service networks. Further, it should be noted that the arrangement and number of service network nodes and other components in FIG. 2 are provided for the purposes of illustration only, and that other network arrangements may be provided to implement the features of the present invention. For example, depending on the size of the service network and number of customers or users to which service is to be extended, more or less than four service network nodes may be provided.

In FIG. 2, each service network node 92A-92D may be implemented as a Service Switching Point (SSP) that is equipped with Common Channel Signaling (CCS) capabilities to provide two-way communication of data messages between each service network node and a Service Control Point (SCP) or Integrated Service Control Point (ISCP) 10 via CCS links 50. Each SSP 92A-92D may comprise a programmable switch which is capable of recognizing AIN-type calls, launching queries to the ISCP 10, and receiving commands and data from the ISCP to further process and route AIN-type calls. The SSPs of the service network nodes 92A-92D may include, but are not limited to, 5ESS and DMS switches. If 5ESS switches are utilized, then these switches should be equipped with Generic 5E10 (or higher) software and provide the necessary trigger requirements in order to provide service to users. For DMS switches, these switches should be equipped with DMS release NA(LEC/LET)004 or Generic NA005 (or higher) software, and the necessary trigger features should be provided. When one of the SSPs 92A-92D is triggered by a AIN-type call, the SSP formulates an AIN query request and responds to call processing instructions in which the AIN service logic resides. The AIN service logic may reside in a database at the ISCP 10. As shown in FIG. 2, the SSPs 92A-92D may be interconnected by PRI network links 57 to carry voice and/or data signals over the PRI network.

As noted above, the SSPs 92A-92D are equipped with CCS capabilities which provide for two-way communication of data messages between the service network nodes and the ISCP 10 via CCS links 50. The data messages may be formatted in accordance with Transaction Capabilities Applications Protocol (TCAP). In the embodiment of FIG. 2, each of the service network nodes 92A-92D are directly connected to and communicate with ISCP 10. However, it is possible to provide Signal Transfer Points (STPS) between the service network nodes 92A-92D and the ISCP 10 in order to facilitate the transfer of messages to and from the ISCP.

The ISCP 10 of FIG. 2 may be implemented as an integrated system or as a stand-alone, programmable Service Control Point (SCP). If the ISCP 10 is implemented as an integrated system, the ISCP may include a Service Management System (SMS), a Data and Reporting System (DRS), a programmable SCP, and a Service Creation Environment (SCE) (not shown in FIG. 2). The SCE is a terminal attached to the SMS for programming the database in the SCP which defines the service logic. If, however, the ISCP 10 is implemented as a stand alone SCP, then it may be remotely programmable to provide AIN functionality. In either case, the SCP may execute software-based, Call Processing Record (CPR) service logic and return call routing instructions to the SSPs for disposition of service calls. The SMS and DRS are generally provided to compile calling information to be used for billing and administrative purposes. By way of example, the ISCP 10 may be implemented with the Bellcore Integrated Service Control Point (ISCP), loaded with ISCP software Version 4.4 (or higher), available from Bellcore, Murray Hill, N.J.

Each of the service network nodes or SSPs 92A-92D may be connected by Multi-Frequency (MF) links 70 to one or more emergency/911 tandem switches 62 to handle and receive, for example, poison assistance calls. Existing 911 tandem switches 62 may be utilized to handle and route poison assistance calls to the poison control service network. Dedicated trunks on the MF links 70 may be established for transferring service calls from the 911 tandems 62 to the SSPs 92A-92D. Depending on the number dialed by the calling party, poison assistance service calls may be directly routed to one of the service network nodes 92A-92D and PCAP locations 94A-94D (e.g., if the number of one of the PCAP locations 94A-94D is dialled), or may be transferred to the poison control service network after first being routed to a 911 operator at a Public Service Answering Point (PSAP) 65 connected to one of the 911 tandem switches (e.g., when a "E911" or "911" emergency call is placed). A 911 operator may transfer a call by pressing, for example, a transfer button or another function button at their customer premise equipment so that the service call will be sent to the serving SSP. For service calls that are transferred via the MF links 70, the SSPs 92A-92D may be configured to trigger whenever a service call is received over the dedicated trunk groups of the MF links. When a service call is transferred to one of the service network nodes or SSPs 92A-92D from the 911 tandems 62, an AIN trigger event will occur at the SSP and AIN call processing will be initiated by launching a query to the ISCP 10 via one of the CCS links 50. Thereafter, routing of the service call will be performed in accordance with the response message and routing instructions returned from the ISCP 10.

In the embodiment of FIG. 2, each of the service network nodes 92A-92D may be connected to one or more 911 tandem switches 62 by MF links 70. For purposes of illustration, FIG. 2 depicts service network nodes 92A being connected to one or more 911 tandem switches 62 through MF links 70. Conventional 911 call signalling protocols may be used when transferring service call requests from the 911 tandems 62 to the SSPs 92A-92D via the dedicated trunk groups of the MF links 70. When a service call is to be transferred to one of the SSPs 92A-92D, the SSP may receive the called number (e.g., "911"), as well as the number of the calling party (i.e., the number of the poisoned party). The SSP may receive the last seven digits of the poisoned party's number with a preceding, coded digit indicating the trunk group or NPA of poisoned party. The SSP may also receive billing information to identify the incoming trunk line.

Although not shown in FIG. 2, each of the other service network nodes 92B-92D may also be connected to one or more 911 tandem switches 62 by dedicated MF trunks 70. Each 911 tandem switch 62 may be connected to a PSAP location 65 by a communication link 58. Communication link 58 may comprise a trunked communication line or other type of communication line. An exemplary End Office (EO) 22 is also illustrated in FIG. 2, as being connected to one of the 911 tandem switches 62 by a communication link 58. The EO 22 may serve a plurality of individual telephone locations 30-38 that are connected to the EO by telephone lines 54. In addition, other customer telephone locations and End Offices may also be provided in the embodiment of FIG. 2, which are connected to other EOs and 911 tandem switches that are connected to, for example, service network nodes 92B-92D.

According to the present invention, AIN-type call processing may be utilized in order to determine routing information for service calls placed to the poison control service network. Predefined tables may be stored in the ISCP 10 so that the appropriate routing information is returned to the service network nodes or SSPs 92A-92D. Each of the tables may be populated with data prior to the service being activated. AIN-type call-processing may be initiated by the SSPs 92A-92D when a service call is transferred to the network and an AIN trigger event is detected. The AIN trigger and launching of the query message to the ISCP 10 may take place at the originating service network node or SSP that receives the service call over the dedicated MF trunk group. When the query message is received by the ISCP 10, the appropriate CPR service logic may be triggered and accessed, so that the necessary database tables may be searched and routing information returned to the querying SSP to direct the service call to the appropriate PCAP location.

Figure 3:
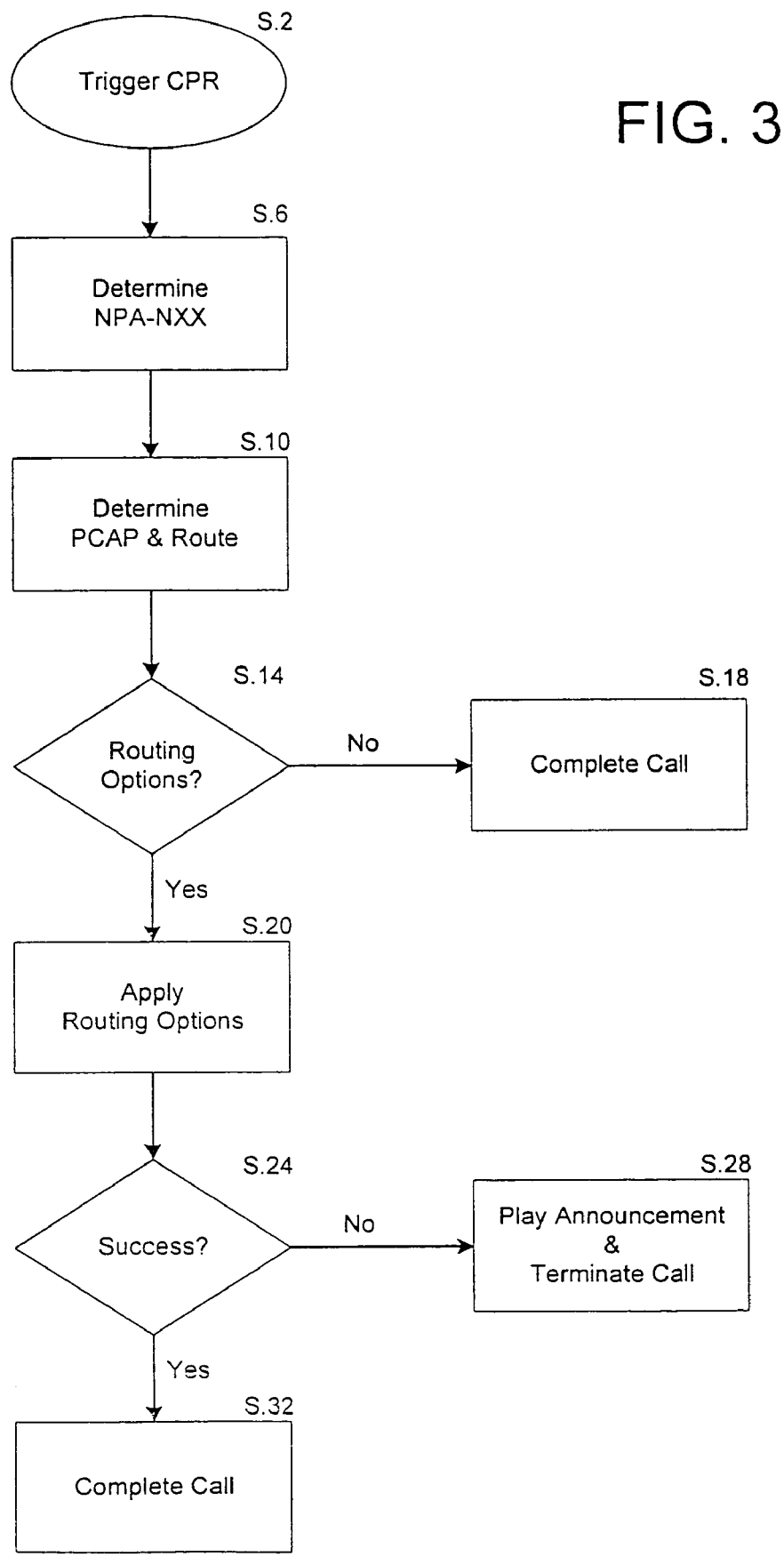
FIG. 3 is a flow chart of exemplary processes and operations for providing intelligent call routing capabilities, in accordance with an aspect of the present invention.

In accordance with an aspect of the present invention, FIG. 3 is a flow chart of exemplary operations and processes that may be performed to provide intelligent call routing. The processes and operations performed in FIG. 3 may be performed based on software-based logic residing in the ISCP 10. At step S.2, processing is initialized when CPR service logic is triggered in response to a query message being received at the ISCP 10 from one of the SSPs 92A-92D via CCS links 50. The query message that is sent to the ISCP 10 may be provided in TCAP format and include the number of the calling or poisoned party (e.g., the seven digit number, NXX-XXXX of the poisoned party, preceded by a coded digit indicating the NPA of the poisoned party). The query message may be, sent in response to the detection of an IN trigger event at one of the service network nodes or SSPs 92A-92D. The SSPs 92A-92D may be configured to trigger whenever a service call is transferred over one of the dedicated trunk groups of the MF links 70.

The presence of an AIN trigger event may result under a variety of circumstances. For example, an individual who requires the assistance of poison specialists may dial a single publicized telephone number (e.g., "911") from a telephone location (e.g., telephone location 38). The service call is then-routed to the appropriate 911 tandem switch 62 by EO 22 and the call is received by a 911 operator at a PSAP location 65. When the 911 operator determines that the individual requires special assistance, such as counseling from a poison specialist, the service call may be transferred from the PSAP 65 to one of the service network nodes or SSPs 92A-92D via the 911 tandem switch 62 and MF links 70. As noted above, when a service call is transferred to the SSPs 92A-92D, the number of the poisoned party may be transferred to the receiving SSP (e.g. SSP 92A). An AIN trigger event may then be detected by the receiving SSP, and an appropriate query message may be sent to the ISCP 10 via one of the CCS links 50 to trigger the CPR service logic for intelligent call routing.

At step S.6, the NPA-NXX of the calling party is determined by the ISCP 10. The NPA-NXX of the calling party may be determined based on the information provided in the query message from the SSP. For example, as noted above, the query message may contain the seven digit number of the calling or poisoned party (i.e., NXX-XXXX) and a coded digit identifying the NPA, as well as billing information indicating the incoming trunk located between the 911 tandem switch and the originating or querying SSP. If the calling party's full ten digit telephone number (including NPA and NXX) is provided as part of the query message sent to the ISCP 10, then the NPA-NXX may be determined directly from the information contained in the query message. On the other hand, if only the eight digit number of the calling party (i.e., the seven digit number preceded by the coded NPA digit) and the incoming trunk number is provided in the query message, then the NPA-NXX may be determined by searching a stored NPA table (e.g., using the coded NPA digit and/or the incoming trunk number as search keys). From the AIN query message, the QCOLLECTEDADDR parameter may be used to obtain the calling party's NXX and the QCHARGENUMBER parameter may be used to determine the incoming trunk.

After the NPA-NXX of the calling party is determined at step S.6, then the appropriate PCAP location 94 and route may be determined by the ISCP 10 at step S.10. One or more database tables may be utilized to determine the PCAP location and route index based on the NPA-NXX of the calling party. Such database table(s) may be predefined, and may group and assign NPA-NXX numbers to particular PCAP locations. Other tables may also be provided that contain routing options, which may cause the service call to be routed to alternate PCAP location(s) depending on predefined routing options.

According to an aspect of the present invention, the service network nodes or SSPs 92A-92D, the PCAP locations 94A-94D, and the PRI network links 57 may be numbered and labelled in order to accommodate different potential routing schemes. For example, each service network node 92A-92D and each PCAP location 94A-94D may be assigned a specific number or code. The corresponding PCAP route index over the PRI network 57 may be numbered by appending the number of the terminating PCAP location to the number of the originating service network node. Further, a corresponding outpulse number may be assigned for each PCAP route. For example, a call originating in a service network node assigned a number value of "4" and terminating at a PCAP location assigned a number value of "6", would use PCAP route "46" and would be outpulsed on the number (e.g., 5126761166) corresponding to the identified PCAP location.

At step S.14 in FIG. 3, the ISCP 10 determines whether there are any routing options or restrictions for the identified PCAP location or route. These routing options or restrictions may comprise, for example, a routing options that are based on the time-of-day, day-of-week, specific dates and/or percentage allocation. The determination of whether routing options are present, may be performed by the ISCP 10 by analyzing, for example, a routing option status flag or by searching a routing options table (e.g., using the identified PCAP location or name as a search key).

At step S.14 in FIG. 3, if it is determined that there are no routing options, then logic flow may proceed to step S.18 so that the routing information determined at step S.10 is returned to the querying SSP (e.g., in the form of a response message from the ISCP 10) and so that the call may be completed to the identified PCAP location. If, however, it is determined that routing options exist at step S.14, then logic flow proceeds to step S.20 where the routing options are applied. At step S.20, a routing options table may be accessed and analyzed by the ISCP 10 to determine if the service call should be routed to another PCAP location or whether the service call cannot be completed. Different routing options may be implemented. For example, a routing options table may be defined to provide routing based on the day-of-week and/or time-of-day, so that the service calls may be routed to another PCAP location during off-hours-or when a PCAP location identified in step S.10 is not operating to receive calls.

At step S.24, it is determined whether the routing options have been applied successfully and that a PCAP location has been identified. If it is determined that the application of the routing options has not resulted in the successful identification of a PCAP location, then logic flow proceeds to step S.28, where an instruction may be sent back from the ISCP 10 to the SSP to play an announcement to the 911 operator or user to indicate that the service call could not be completed and/or to thereafter terminate the call. If, however, the routing options have been successfully applied, then logic flows to step S.32 where the same or modified routing instructions are sent back to the SSD from the TSCP 10 to complete the call according to the appropriate routing information. If, for example, calls are to be routed based on the time-of-day and/or day-of-week, then the service call will be routed to the PCAP location identified at step S.10 when the call is received during valid hours and/or days of operation. If calls are received during off-hours and/or days of operation, then a service call may be routed to another PCAP location at step S.32 (i.e., a location different from the PCAP location identified in step S.10). If, however, an off-hour PCAP location is not identified in the routing option table, or if routing cannot otherwise be completed successfully, then a recorded announcement may be played back to the user to indicate that service cannot be extended, as illustrated at step S.28.

Figure 4A:
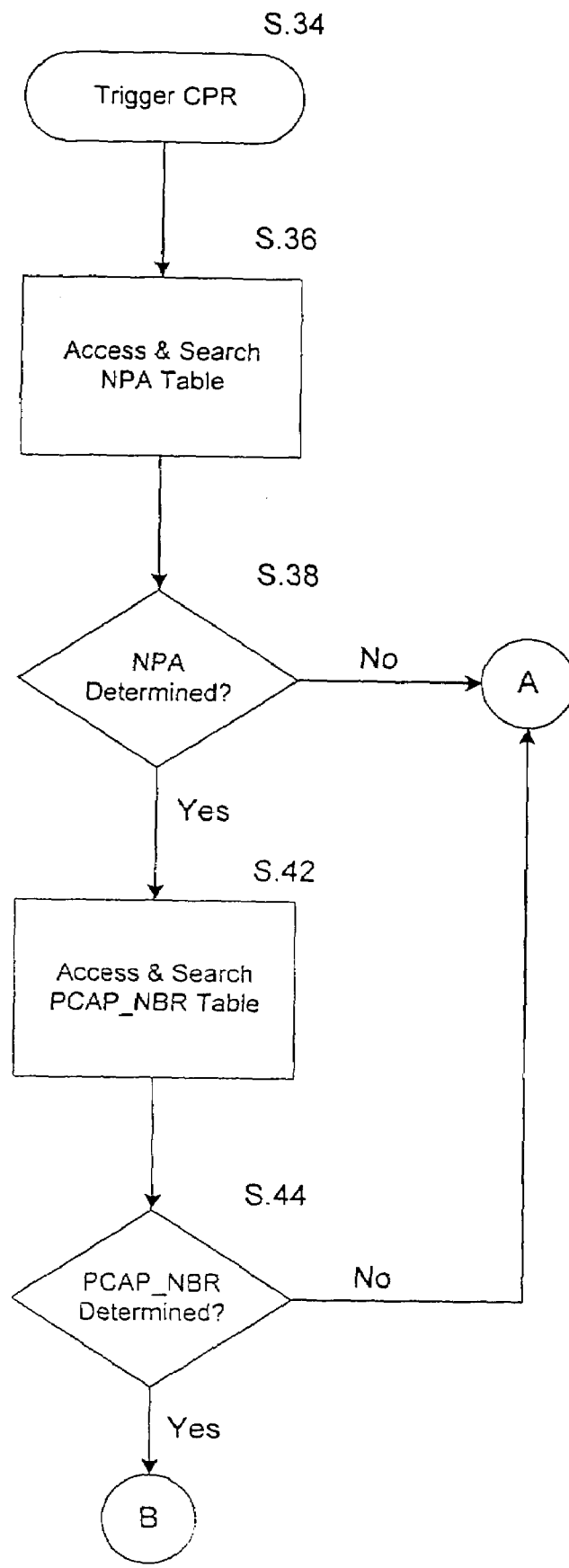
FIGS. 4A and 4B illustrate, in accordance with one implementation of the present invention, the logic flow of exemplary processes and operations for providing intelligent call routing features.
Figure 4B:
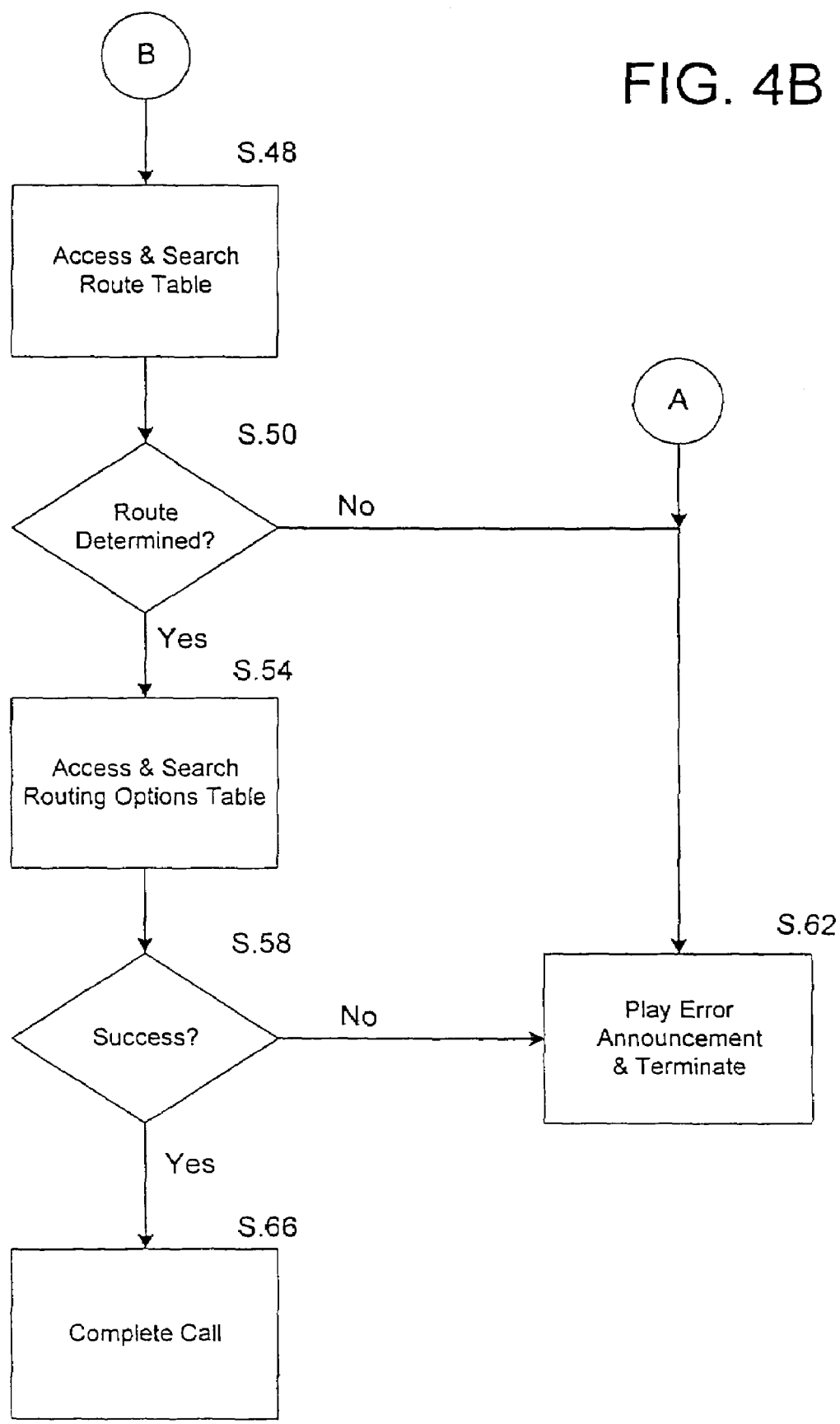

FIGS. 4A and 4B illustrate, in accordance with one implementation of the present invention, the logic flow of exemplary processes and operations for providing the intelligent call routing features of the invention. The processes and operations performed in FIGS. 4A and 4B may be performed based on software-based service logic residing in the ISCP 10. One or more predefined database tables may also be provided in the ISCP 10 to implement the intelligent routing features of the invention, as described herein. Examples of the various tables that may be utilized with the embodiment of FIGS. 4A and 4B are provided and discussed below with reference to Tables 1-4.

At step S.34 in FIG. 4A, intelligent call routing is initialized when the CPR service logic is triggered in response to, for example, an AIN query message being received at the ISCP 10. The AIN query message may be sent from the originating service network node or SSP and may be received by the ISCP 10 via one of the CCS links 50. Each SSP 92A-92D is responsible for formulating an appropriate query message for intelligent call routing, so that the corresponding CPR will be triggered and accessed at the ISCP 10. At step S.36, an NPA table is accessed and searched in order to determine the NPA of the calling party. In accordance with an aspect of the present invention, the NPA of the calling party may be determined based on the incoming trunk number and the NPA code appended to the calling party's seven digit telephone number. The trunk number and NPA code may be sent as part of the information included in the query message sent to the ISCP 10 from the originating or querying SSP. The trunk number may correspond to the number of the incoming trunk located between the 911 tandem switch and the originating SSP where an AIN trigger event was detected. The ISCP 10 may use the incoming trunk number and/or the NPA code to search a predefined NPA table in order to determine the NPA for the calling party.

Table 1 is an exemplary NPA table that may be stored in the ISCP 10 and searched at step S.36 to determine the NPA of the calling party. As shown in Table 1, the NPA table may include a IN_TRUNK field containing all of the possible incoming trunk numbers. The IN_TRUNK field may be defined, for example, as a number string containing up to ten digits. The NPA table may also include a corresponding NPA_CODE field and a corresponding NPA field for each IN_TRUNK field entry. The NPA_CODE and NPA fields may be defined, for example, as a number string-containing one or three digits. The NPA_CODE field may contain the coded NPA digit that is appended to the calling party's seven digit number. The valid digits for the NPA_CODE field may comprise, for example, 0-7. The NPA field contains the actual NPA values that correspond to the single digit NPA code and incoming trunk number for each entry in the table.

TABLE 1

NPA TABLE

| IN_TRUNK | NPA_CODE | NPA |
|---|---|---|
| 0000111000 | 2 | 214 |
| 0000121000 | 2 | 214 |
| 0000131000 | 2 | 214 |
| 0000141000 | 5 | 512 |
| 0000151000 | 7 | 713 |

At step S.38 in FIG. 4A, it is determined whether the NPA of the calling party was located from the NPA table. If the NPA of the calling party was successfully determined, then logic flow proceeds at step S.42. Otherwise, if the NPA cannot be determined from the database table, then logic flow proceeds to step S.62 (see FIG. 4B) so that an appropriate message may be played back to indicate that the service call cannot be properly routed or completed.

At step S.42, a PCAP_NBR table may be accessed and searched in order to determine the PCAP location to which the service call should be sent. In accordance with the present invention, the PCAP location may be determined based on the location of the calling party. The NPA or NPA-NXX of the calling party's telephone number may be utilized to determine the location of the calling party and the PCAP location to which the service call should be sent. Each of the available PCAP locations may be assigned a number, and a PCAP_NBR table may be provided at the ISCP 10 to indicate the number of the PCAP location that should receive the service call from the calling party.

Table 2 illustrates an exemplary PCAP_NBR table for locating the number of the PCAP location based on the NPA-NXX of the calling party. Each of the fields in the PCAP_NBR table may be defined as a number string, containing two or three digits. As shown in Table 2, a NPA field may be provided to indicate the NPA's that are serviced by each PCAP location in the network. A NXX_BEG field and a NXX_END field may also be provided to indicate, along with the NPA field, the range of NPA-NXXs that each PCAP location is associated with. A PCAP_NBR field may also be provided to indicate the number that is assigned to the PCAP location for each corresponding entry. If a particular PCAP location is assigned or maps to multiple, consecutive NXXs within a particular NPA, then a range can be inputted rather than listing each NXX separately. For example, if a PCAP location assigned a number of "03" controls NXXs 577-999 inclusive within NPA 214, then the NXX_BEG field would contain "577", the NXX_END field would contain "999" and the PCAP_NBR field would contain "03". If, however, a particular-PCAP location was only mapped to one NPA-NXX, then the NXX_BEG field and the NXX_END field would contain the same value.

TABLE 2

PCAP_NBR TABLE

| NPA | NXX_BEG | NXX_END | PCAP_NBR |
|-----|---------|---------|----------|
| 214 | 000 | 463 | 01 |
| 214 | 464 | 576 | 02 |
| 214 | 577 | 999 | 03 |
| 512 | 000 | 999 | 04 |
| 713 | 000 | 999 | 06 |

At step S.44, it is determined whether a PCAP location number was successfully determined at step S.42. If a PCAP location could not be found or located for the NPA or NPA-NXX of the calling party, then logic flows to step S.62 (see FIG. 4B), where the ISCP 10 sends a response message to the SSP to play an announcement indicating that service is not available. If, however, a PCAP location number was determined, then logic proceeds to step S.48 in FIG. 4B. At step S.48, a predefined Route table is accessed and searched by the ISCP 10 to select the appropriate trunk routing and outpulse number based on the identified PCAP location number. The PCAP location number identified at step S.42 may be used by the ISCP 10 to search the Route table and determine the trunk routing and outpulse number for the identified PCAP location.

Table 3 is an exemplary Route table that may be utilized by the ISCP at step S.48 to determine the routing information for the identified PCAP location. Each of the fields in the Route table may be defined as an alphanumeric or number string. As shown in Table 3, a PCAP_NAME field may be provided to indicate the name of the service or control center for each of the PCAP locations identified by the PCAP_NBR field. The PCAP-NAME field may be provided to make the table more "readable" for data entry and be used as a search key for other tables (e.g., a routing options table). A RTE_INDX field and OUTP_NBR field may also be provided in the Route table to indicate the primary route index used to route the call and the PCAP location telephone number to be outpulsed. The Route table may also include a DISASTER_PCAP field to indicate alternate PCAP locations for disaster recovery purposes. The DISASTER_PCAP field may indicate the number assigned to each alternate PCAP location. Under normal conditions, the PCAP_NBR field and the DISASTER_PCAP field should contain similar values. If conditions warrant, the DISASTER_PCAP field may contain values that are changed to another PCAP location value, so that all calls intended for the original PCAP location will be routed to the PCAP location identified in the DISASTER_PCAP field.

TABLE 3

ROUTE TABLE

| PCAP_NAME | PCAP_NBR | DISASTER_PCAP | RTE_INDX | OUTP_NBR |
|-----------|----------|---------------|----------|----------|
| DALLAS-1 | 01 | 08 | 00000181 | 2146761111 |
| DALLAS-2 | 02 | 08 | 00000102 | 2146761122 |
| DALLAS-3 | 03 | 09 | 00000103 | 2146761133 |
| S-ANTONIO | 04 | 12 | 00000406 | 5126761166 |
| HOUSTON | 06 | 18 | 00000605 | 7136761155 |

At step S.50 in FIG. 4B, it is determined whether the routing information was successfully determined in step S.48. If the route index and the outpulse number were not successfully determined, then the logic flow proceeds to step S.62 so that the ISCP 10 will send a response message to the SSP to instruct that an error announcement should be played to indicate that service cannot be extended to the calling party and/or that the call should be terminated. If, however, routing information is successfully determined, then at step S.54 a Routing Options table may be accessed and searched to perform and execute any required routing options for the identified PCAP location. As disclosed herein, routing options may be combined with the features of the present invention in order to route service calls to the most appropriate PCAP location. If an identified PCAP location assigned to a calling party is closed or accessed during off-hours, service calls may be directed to an off-hour or backup PCAP location. The routing options searched at step S.54 may comprise, for example, routing based on the time-of-day and/or day-of-week. Other routing options, such as percentage allocation and specific date routing, may be also implemented.

Table 4 illustrates an exemplary Routing Options table that may be accessed and searched by the ISCP 10 at step S.54. The exemplary Routing Options table of Table 4 is based on a time-of-day/day-of-week routing scheme. As indicated in Table 4, the actual name of the service or control center at each PCAP location may be identified by a PCAP_NAME field, and the name of the PCAP location (e.g., as identified by the Route table) may be used as a key to searching and finding the appropriate routing information. The hours of operation for each day of the week may be indicated for the PCAP locations identified in the PCAP_NAME field. Separate START and END time fields may be provided in the Routing Options table for particular days of the week or group of days during the week (e.g., "MF" for Monday through Friday, and "SS" for Saturday through Sunday). The time fields may indicate both the hour and minute that the PCAP location starts operation or ends operation. In order to distinguish between morning and evening hours, a military time format may be used in each of the time fields. In the exemplary embodiment of Table 4, a MF_START field and an MF_END field are provided to indicate the hour and minute that each PCAP location starts and ends operation Monday through Friday. The hours of operation on weekdays are also indicated by separate time fields (see, for example, SS_START and SS_END). An OFF_HR_PCAP field may also be provided to indicate the number of a PCAP location that all off-hour calls should be routed to when encountered.

TABLE 4

ROUTING OPTIONS TABLE

| PCAP_NAME | MF_START | MF_END | SS_START | SS_END | OFF_HR_PCAP |
|---|---|---|---|---|---|
| DALLAS-1 | 07:00 | 19:00 | 07:00 | 12:30 | 10 |
| DALLAS-2 | 07:00 | 19:00 | 07:00 | 12:30 | 10 |
| DALLAS-3 | 07:00 | 19:00 | 07:00 | 12:30 | 10 |
| S-ANTONIO | 06:30 | 20:00 | 10:00 | 15:00 | 14 |
| HOUSTON | 09:00 | 17:00 | 09:00 | 13:00 | 21 |

In the embodiment of Table 4, if a particular PCAP location is to be opened twenty-four hours during particular days of the week (such as Monday through Friday), then the start and end fields for those days of the week should both be set to "00:00". If, for example, a particular PCAP location is to be closed on a particular day or group of days (such as Saturday and Sunday), then both the start and end time fields should contain "12:00". Further, if the number of an alternate PCAP location is returned by, for example, the OFF_HR_PCAP field when searching the Routing Options table, then the routing information (including a route index and outpulse number) may be obtained by accessing another database table similar to the Route table of Table 3. Similarly, if disaster routing is performed and a number of a PCAP location is provided from the DISASTER_PCAP field of the routing table, the number of the alternate PCAP location may be used as a key to index another route table to determine a route index and other routing information (e.g., the number of the alternate PCAP location to be outpulsed). Various modifications may also be made to the Routing Options table, such as providing hours of operation for particular dates or holidays, and routing calls to alternate locations based on the percentage of allocation or number of calls received at predefined PCAP location(s).

Referring again to FIG. 4B, after step S.54 it is determined at S.58 whether the searching of the Routing Options table has been successful (i.e., whether the identified PCAP location or an alternate PCAP location is available for the service call). If it is determined that the search of the Routing Options table was successful, and that routing information has been obtained for the service call, then logic proceeds to step S.66. At step S.66, a response message with the routing information is sent back to the originating or querying SSP so that the service call may be completed to the appropriate PCAP location over PRI network. 57. If, however, the ISCP 10 determines that the service call cannot be successfully routed, then logic proceeds to step S.62 where instructions are provided to the SSP to play an error announcement to the user and/or to thereafter terminate the call.

The information that is returned to the SSP by the ISCP 10 may be formatted according to TCAP and sent as a response message via one of the CCS links 50. The response message may include the appropriate routing information, including the route index and the number to be outpulsed, as well as other information. When the call is routed over the PRI network 57 to the appropriate PCAP location, the full 10-digit telephone number of the calling party may be transmitted and delivered to the PCAP attendant. That is, the response message from the ISCP 10 may include the determined NPA-NXX of the calling party, so that the querying SSP may build and send the full ten digit number of the calling party (i.e., the NPA-NXX-XXXX of the calling party) to the PCAP location over the PRI network 57 by rearranging or modifying the appropriate parameters.

In accordance with another aspect of the present invention, a call return capability or feature may be provided to permit personnel at PCAP locations to return or transfer a service call back to the originating PSAP (or another appropriate PSAP) for dispatch of emergency services (e.g., ambulatory services) or other final disposition. As with the initial routing of the service call, the return call may be routed and returned via the PRI network 57. The intelligent call return features of the present invention may be implemented as an AIN-based service, with the appropriate service logic and database tables being provided in the ISCP 10 for providing routing information and call return functionality. In addition, the call return features may be combined with the intelligent call routing features of the present invention to provide combined service features. The various aspects of the intelligent call return capabilities of the invention is described below with reference to FIGS. 5-8.

As discussed above with reference to the embodiment FIG. 2, the intelligent call routing features of the invention may include routing options such as off-hours and/or disaster routing. Since one or more options can be in effect at any given time, a calling party that is directed to the poison control service network could be routed to any PCAP location 94A-94D, without regard to the location of the serving switch or the geographic location of the calling party. Therefore, when a call return service request is received at one of the service network nodes 92A-92D, the call should not necessarily be routed to the closest 911 tandem switch or even to the 911 tandem that is connected to the service network node receiving the call return request. Service logic in the form of a CPR should be provided in the ISCP 10 to determine which 911 tandem switch should receive the call based on, for example, the location or NPA-NXX of the calling party.

In order to implement the call return features of the present invention, the ISCP 10 may be provided with call return service logic and database tables in order to determine the appropriate routing information for the returned call. When a PCAP attendant at one of the PCAP locations 94A-94D determines that the service call needs to be returned to an operator (e.g., a 911 operator) at one of the PSAP locations 65, the PCAP location attendant may send the telephone number of the calling party to the serving or local service network node. The number of the calling party should be dialed on a ten digit basis (i.e., so as to include the NPANXXXXXX of the calling party, with no hyphens, "1+", "0+", etc.) and may be sent over the PRI link 97 connecting the PCAP location to the serving service network node or SSP. Since any PCAP attendant can potentially dial any NPA-NXX for a given locality or state, digit validation may be performed based on the first digit dialed. That is, any dialed number that is ten digits in length should trigger the serving SSP if the first digit is in the range of 0 through 9. However, since valid NPAs may be limited (e.g., a valid NPA may not begin with a 0 or 1), this range could be limited to the digits 2 through 9, or could consist only of the digits that are valid first digits for NPAs serviced by the poison control service network.

The customer premise equipment at the PCAP location may be configured according to several alternatives in order to permit the ten digit called number to be sent over the PRI trunk to the service network node. For example, the attendant at the PCAP location may perform a manual flash-hook, invokes a conference circuit in the customer premise equipment, and then keys in the ten digit number of the calling or poisoned party, which is sent over the PRI trunk group 97 to the serving SSP. Alternatively, the customer premise equipment at the PCAP location may be configured with a feature button (e.g., a TRANSFER button) that automatically invokes the conference circuit and allows the attendant to key in the ten digit number of the calling party. Still further, as another alternative, the customer premise equipment may be configured with a feature button or abbreviated dial code (e.g., "*911") that automatically invokes the conference circuit, seizes the appropriate PRI trunk group, and transmits the ten digit number of the calling party that is displayed on the attendant's screen.

The serving service network node or SSP may trigger on the receipt of the ten digit number of the calling party from the PCAP attendant, in order to launch an AIN query to the ISCP 10 via one of the CCS links 50. A segregated trunk group of one or more channels may be established on the PRI link 97 that serves the attendant's PCAP location. The PCAP location premise equipment may be configured to send calls to the segregated trunk group for call return traffic only. While the group may still be used to determine incoming traffic (i.e., calls that are sent from the serving service network node to the PCAP location), traffic that is outgoing from the PCAP location to the service network node may be restricted to call return traffic only on this group, if the trunk group is to be provisioned with a trigger (e.g., a Off-Hook Delay trigger) that generates AIN queries to the ISCP 10. Whenever a call containing a valid ten digit number is transmitted over this group, a trigger will always occur at the SSP to invoke the transmission of a query message to the ISCP 10 for call return processing. A more detailed description of the various processes and operations that may be performed in order to provide the call return features of the present invention are provided below.

Figure 5:
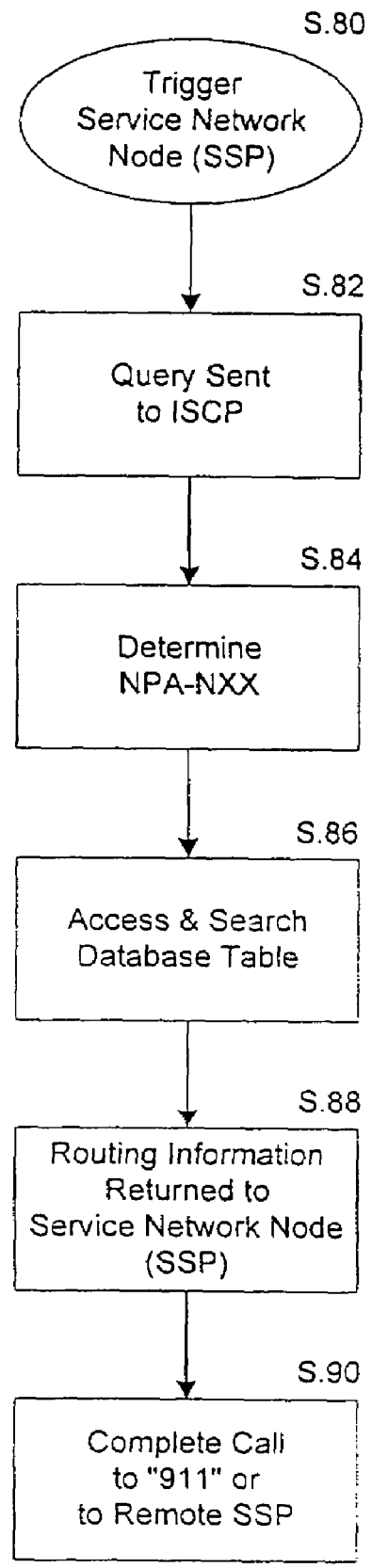
FIG. 5 is an exemplary flow chart of the processes and operations for providing intelligent call return capabilities, in accordance with an aspect of the present invention.

FIG. 5 illustrates an exemplary logic flow of the processes and operations for performing intelligent call return in accordance with an embodiment of the present invention. At step S.80, call return processing is initiated when a trigger event is detected at one of the service network nodes or SSPs 92A-92D. As discussed above, a trigger event may be detected at one of the SSPs 92A-92D when a call return request is placed from a PCAP location via PRI link 97. A segregated trunk group of one or more channels may be established on the PRI link 97 to handle call return traffic. Whenever a call return request containing a valid ten digit number is sent over this segregated trunk group, a trigger may be engaged at the SSP serving the PCAP location to invoke call return processing.

As noted above, each of the service network nodes 92A-92D may be implemented as SSPs with AIN functionality (e.g., AIN 0.1 functionality). For 5ESS and DMS switch types, the service network nodes 92A-92D may be provided with, for example, AIN 0.1 functionality in 5ESS Generic 5E9.1 or 5E10 (or higher), and in DMS Release NA(LEC/LAT)004 or Generic NA005 (or higher), respectively. If ISCP 10 is implemented as an integrated system, ISCP Version 4.4 or other compatible software releases may be provided in the ISCP. In service network nodes implemented with 5ESS switches, the AIN Off-Hook Delay trigger may be utilized, with a trigger criteria type of "PRI B Channel Setup", and for DMS switches, the AIN Off-Hook Delay trigger may be utilized with a trigger criteria type of "Off-Hook Delay".

When a trigger is engaged at step S.80, the service network node encountering the trigger will formulate and send, at step S.82, an AIN query message to the ISCP 10 via a CCS link 50. The AIN query message that is sent to the ISCP may include the number of the calling or poisoned party, including the NPA-NXX of the poisoned party, as well as the number of the PCAP location which initiated the call return request. The number associated with the PCAP location may be used by the ISCP 10 to identify the appropriate service logic or CPR to perform call return processing. CPR service logic may be provided for each PCAP location, or one CPR may be provided for all PCAP locations. At step S.84, in accordance with the service logic, the ISCP 10 may determine the NPA-NXX of the poisoned party, which may be contained in a QCOLLECTEDADDR parameter of the query. At step S.86, an appropriate database table may be accessed and searched based on the NPA-NXX of the poisoned party to determine the routing information for the call return. In accordance with an aspect of the present invention, a stand-alone table may be stored in memory in the ISCP 10 for each service network node 92A-92D. Each stand-alone table may provide call return routing information for return calls based on the NPA-NXX of the poisoned party. The ISCP 10 may search and access the appropriate database table based on the service network node that launched the query to the ISCP.

At step S.88 in FIG. 5, the ISCP 10 may determine and return the appropriate call return routing information in a response message to the querying SSP node via one of the CCS links 50. If the ISCP 10 determines that the call can be returned by routing to a 911 tandem switch 62 that is served by the same service network node as the calling PCAP location. (i.e., a "local" call return), then a route index that identifies the appropriate MF trunk 70 to the 911 tandem switch, a called party number of "911", and a charge number that equals the number of the poisoned party nay be returned in the response message. If, however, the ISCP 10 determines that the call must be sent to a 911 tandem that is served by a different service network node (i.e., a service network node other than the node that generated the query to the ISCP), then in order to route this call (i.e., a "remote" call return) a route index that indicates a route on the PRI network 57 to the remote service network node, a calling party number that equals the number of the poisoned party, and a called party number that is set to a ten digit virtual number on the remote service network node may be returned in the response message.

As a result of receiving the response message from the ISCP 10, the querying SSP node at step S.90 will analyze the routing information and return the call to either the local 911 tandem switch or to a remote service network node identified by the ISCP. For local call returns, the serving SSP may be adapted to automatically delete the NPA from the ten digit calling party number, prepend a "0" and outpulse the correct eight digit format to the 911-tandem. For calls to be routed to a remote service network node, once the call encounters the triggered virtual number in the remote node, another query may be generated to the ISCP so that the call may be processed by the ISCP service logic as in the local call return case described above.

Figure 6A:
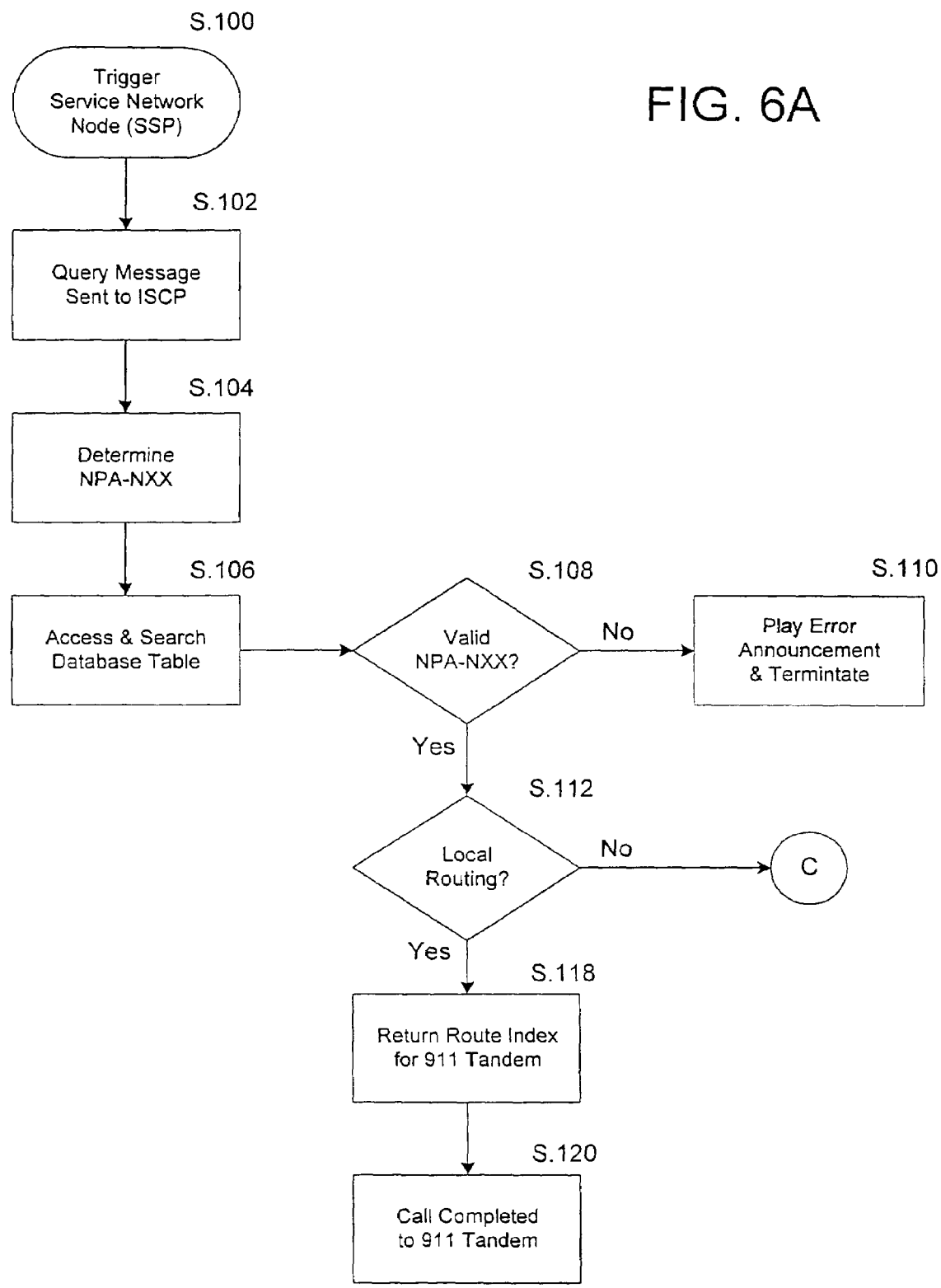
FIGS. 6A and 6B illustrate the logic flow of exemplary processes and operations for performing intelligent call return processing, in accordance with one implementation of the present invention.
Figure 6B:
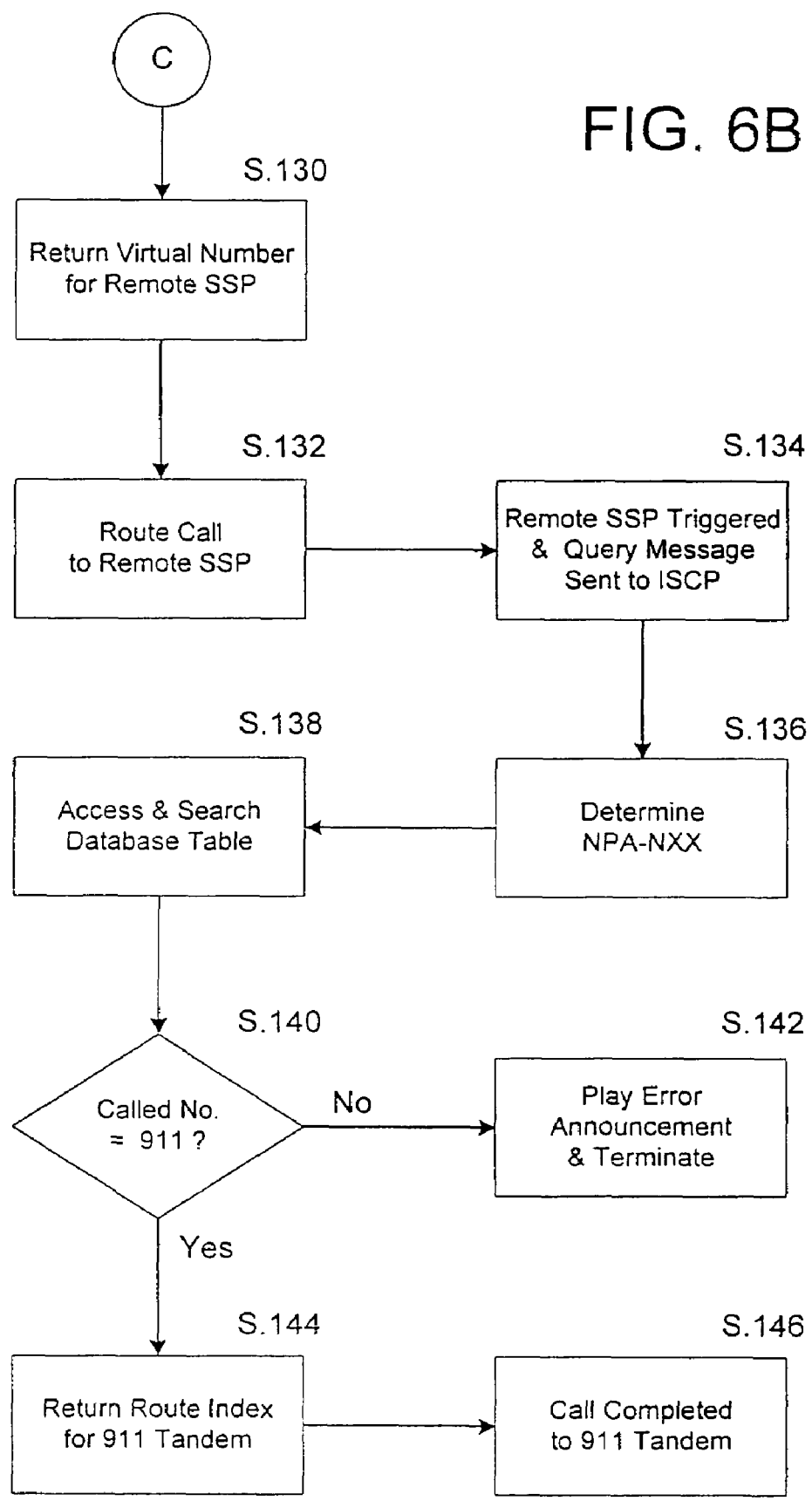

FIGS. 6A and 6B illustrate exemplary processes and operations for performing call return processing in accordance with one implementation of the present invention. The functions and operations represented in the exemplary flow charts of FIGS. 6A and 6B may be implemented through the use of AIN functionality and service logic provided at the ISCP 10. Through the service logic of the ISCP 10, when a call return is requested by a PCAP attendant, an AIN query will be launched to the ISCP 10 from the service network node or SSP serving the PCAP attendant's location. The ISCP 10 will then determine, in accordance with the call return service logic, whether the call should be routed to a 911 tandem that is locally served by the same service network node that generated the query message, or whether the call should be routed to a remote service network node for further processing. Routing tables may be provided in the ISCP 10 in order to facilitate the determination of whether local or remote routing is necessary based on the NPA-NXX of the calling party. Such routing tables may be provided for each of the service network nodes and may be predefined and populated, on an NPA-NXX basis, with route index or office route information that is required to complete the call.

At step S.100 in FIG. GA, call return processing is initiated when a trigger is encountered at one of the service network nodes 92A-92D. An AIN trigger may be encountered at one of the service network nodes 92A-92D when an attendant at a PCAP location requests call return processing. For example, an attendant at PCAP location 94C in FIG. 2 may decide that the calling party requires ambulance service, and that the call should be returned to the 911 operator serving the calling party. In such a situation, the PCAP attendant may send, via PRI link 97, the ten digit number of the calling or poisoned party to the service network node 92C. Upon receipt of the ten digit calling party number, a trigger will be encountered at the serving service network node (i.e., service network node 92C) to initiate call return processing.

At step S.102, the service network node that encountered the trigger will formulate and send a query message to the ISCP 10 via one of the CCS links 50. The query message that is sent to the ISCP 10 may be TCAP formatted and may include the ten digit calling party number or poisoned party number (PPN), as well as the number of the PCAP attendant requesting the call return. Upon receipt of the query message at the ISCP 10, the appropriate call return service logic or CPR may be searched and accessed at the ISCP. Thereafter, at step S.104, the NPA-NXX of the calling party may be determined based on the information contained in the query message sent to the ISCP. The CPR service logic may determine the NPA-NXX of the calling party based on the QCOLLECT-EDADDR parameter of the query message. At step S.106, the appropriate database table may be accessed and searched by the ISCP 10. As noted above, tables containing routing information for return calls may be populated and stored in the ISCP 10. A stand-alone table may be created for each service network node 92A-92D. The stand-alone tables may be defined with routes for all of the possible NPA-NXX combinations for the state or locality in which the service network is provided. The stand-alone tables containing routing information should be defined to handle any and all calling party numbers from any PCAP location of the service network. Based on the service network node that launched the query, the ISCP 10 may access and search the stand-alone table associated with the querying service network node.

Table 5 illustrates an exemplary stand-alone table that may be stored in the ISCP 10, and the data fields that may be provided in such a stand-alone table for each service network node. Each of the fields in the stand-alone table may be defined as a number string. The NPA field, NXX_BEG field, and NXX_END field are provided in the table to indicate the possible NPA-NXX combinations for each route index. A RTE_INDX field is provided to indicate the route index or office route for each possible range of NPA-NXX. A CALLED_NBR field may also be provided and populated with either the digits "911" (e.g., for local call return routing) or the digits of a virtual number that represent the remote service network node (e.g., for remote call return routing).

TABLE 5

STAND-ALONE TABLE

| NPA | NXX_BEG | NXX_END | RTE_INDX | CALLED_NBR |
|-----|---------|---------|----------|------------|
| 214 | 000 | 576 | 00001211 | 911 |
| 214 | 577 | 999 | 00001131 | 911 |
| 817 | 000 | 999 | 00001131 | 911 |
| 713 | 000 | 999 | 00001561 | 7139990000 |

For example, in the exemplary stand-alone table of Table 5, if a PCAP location served by the service network node corresponding to the table returns a call that originated from a calling party having an NPA-NXX of "214464", the ISCP 10 would determine that an office route of "00001211" should be a route to the MF trunk group 70 that connects the 911 tandem switch 62 that serves "214464". Similarly, for calls being returned to any calling party in the NPA-NXX range of "214577" to "214999", an office route of "00001131" should be a route to the MF trunk group that connects to the 911 tandem that serves those NPA-NXXs. While several entries may be necessary for any given NPA, only a few (or one as shown in Table 5 for an NPA of 817 or 713) may be required for others. For local call return routing, the CALLED_NBR field should be populated with the digits "911", whereas for remote routing the CALLED_NBR field should be populated with the digits of the virtual number that exists for the remote service network node. For example, in Table 5, for NPA-NXXs having a NPA of "713", the ISCP 10 would return an office route of "00001561" that represents the PRI route to the remote service network node, and "7139990000" would be returned representing the virtual number for the remote service network node.

At step S.108 in FIG. 6A, it is determined whether an valid NPA-NXX is present. An invalid NPA-NXX may occur if the PCAP attendant dialed an inaccurate calling party number (e.g., dialed an NPA that is not valid or out of the territory served by the service network) or if the stand-alone table is not populated with all of the possible NPA-NXX combinations. The ISCP 10 may determine that an invalid NPA-NXX is present when the NPA-NXX that was sent in the query message does not match any row in the stand-alone table for the querying service network node. If it is determined that a valid NPA-NXX is not present, then processing may continue to step S.110 where the ISCP 10 returns a response message so that an error announcement is invoked and played back to the PCAP attendant and so that the call is thereafter terminated. The announcement may be prerecorded and contain an error message (e.g., "We're sorry. We cannot complete your call as dialed. Please hang up, check the number, and try again.") to indicate an invalid calling party number is present or has been entered. The recorded announcement that is played back may be constructed from one or more AIN, or other prerecorded phrases.

If a match is found with one of the rows in the stand-alone table, such that a valid NPA-NXX exists, then logic proceeds to step S.112 where it is determined whether local call return routing is required. A call return may be determined to be "local" if the service logic of the ISCP 10 determines that the call return should be routed to a 911 tandem switch that is serviced by the same service network node that launched the query. The presence of local routing may be determined from the stand-alone table. For local routing, the ISCP 10 will locate, for example, a CALLED_NBR field having a value of "911" for the entry or row of the table that matches the NPA-NXX of the calling party. If it is determined at step S.112 that the call return is local, then logic flow proceeds to step S.118, where the ISCP will return a route index or office route that indicates the appropriate MF trunk to the 911 tandem switch (i.e., based on the route index indicated in the RTE_INDX field of the stand-alone database table). Thereafter, at step S.120, the querying service network node or SSP will analyze the routing information contained in the response message and return the call to the appropriate 911 tandem and PSAP/911 operator. The 911 operator may then receive the call and provide further assistance to the calling party (e.g., dispatch an ambulance or-provide other emergency service).

If it is determined that the call return is not local at step S.112, then routing for the call return is determined to be remote and logic proceeds from step S.112 to step S.130 in FIG. 6B. A call is "remote" if the ISCP determines that the call return should be routed to a 911 tandem switch that is serviced or served by a different service network node than the node that generated the query to the ISCP. For remote routing, the digits of a virtual number for the remote service network node will be provided in the CALLED_NBR field for the row or entry corresponding to the calling party's NPA-NXX. At step S.130, the ISCP 10 will return the virtual number to the querying service network node in the form of a response message via one of the CCS links 50. The response message may also include a route index that designates a PRI route on the PRI network 57 to the remote service network node (i.e., a route index indicated by the RTE_INDX field in the database table). The virtual number that is returned may be a ten digit number and may be assigned a 3/6/10D trigger (for a 5ESS switch) or a virtual TAT trigger (for a DMS switch) on the remote service network node.

At step S.132 in FIG. 6B, the querying service network node will analyze the routing information returned in the response message and route the call to the appropriate remote service network node via the PRI route identified by the ISCP 10. The ten digit virtual number may be assigned to the called party number and be used to trigger the remote service network node, as described above. When the call encounters the triggered virtual number in the remote switch at step S.134, another query is generated and sent to the ISCP 10 via one of the CCS links 50. When the query arrives at the ISCP 10, the ISCP 10 may search and access the appropriate CPR service logic identified by the Called Party ID in the query. The Called Party ID may be set to the ten digit triggered number. At step S.136, the CPR service logic may determine the NPA-NXX of the calling party based on the information contained in the query message. The NPA-NXX may be contained in the QCALLINGNUMBER parameter of the query.

Using the NPA-NXX determined at step S.136, the ISCP 10 may access and search the appropriate stand-alone table (see, for example, Table 5) for the remote service-network node that—launched the query. At step S.140, the ISCP 10 determines whether the CALLED_NBR field equals "911". If all of the database tables in the ISCP 10 are correctly populated and defined, the CALLED_NBR field value should always equal 911 whenever a search is performed based on a query launched from a remote service network node. That is, with remote call return routing, the call should always be routed to the appropriate remote service network node that serves the 911 tandem switch for the calling party. If it is determined at step S.140 that the CALLED_NBR field value does not equal "911", then logic flow may proceed to step S.142, where an appropriate error announcement is played back and the call is thereafter terminated. The announcement may be prerecorded and may contain an error message (e.g., "We're sorry. You call cannot be completed as dialed.") to indicate that the call can not be returned or completed as dialed.

If it is determined at step S.140 that the CALLED_NBR field value is equal to "911", then logic flow proceeds to step S.144, where the ISCP 10 returns the route index or office route (e.g., as identified by the corresponding RTE_INDX field) to the 911 tandem in the form of a response message. At step S.146, the remote service network node will analyze the routing information sent from the ISCP and return the call to the 911 tandem switch via the identified office route. The call may then be received by the appropriate PSAP/911 operator so that the calling party may receive any necessary emergency service (e.g., dispatch of an ambulance).

Figure 7:
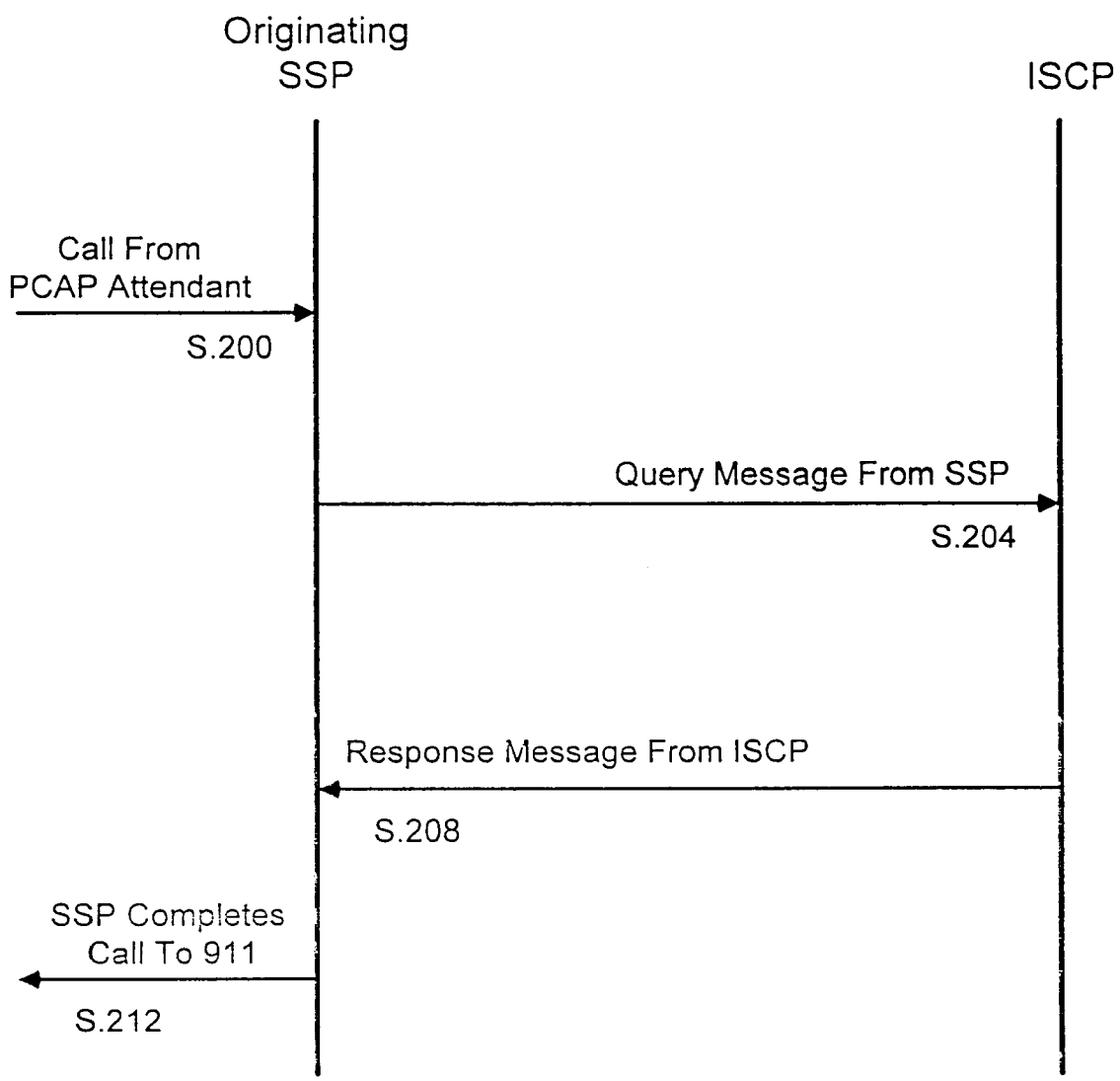
FIG. 7 illustrates an exemplary message flow for local call return routing, in accordance with another aspect of the present invention.
Figure 8:
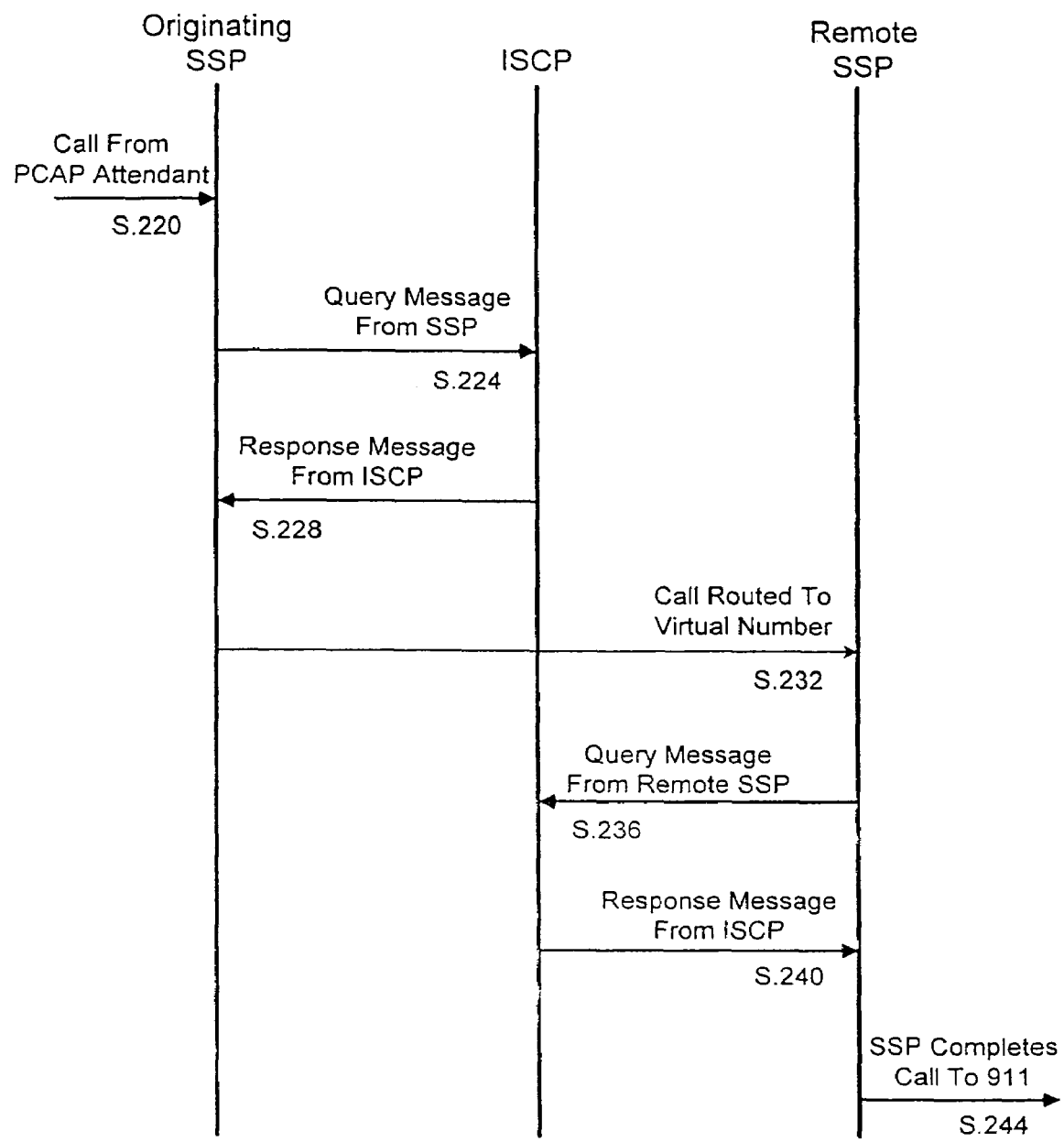
FIG. 8 illustrates an exemplary message flow for remote return call routing, according to another aspect of the present invention.

Referring now to FIGS. 7 and 8, exemplary message flows and exchanges for local and remote call return routing will be provided in accordance with one or more aspects of the present invention. FIG. 7 illustrates an exemplary message flow for local call return routing between a querying service network node (i.e., an originating SSP) and the ISCP. FIG. 8, on the other hand, illustrates an exemplary message flow for remote call return routing between an originating service network node (i.e., an originating SSP), the ISCP, and the remote service network node (i.e., a remote SSP). The exemplary query and response messages illustrated in FIGS. 7 and 8 may be sent over the CCS links 50 and may be formatted in accordance with Signalling System 7 (SS7). For the embodiments discussed below, the service network nodes or SSPs may be implemented as 5ESS switches or DMS switches with AIN functionality and capabilities.

FIG. 7 illustrates an exemplary message flow between an originating SSP and an ISCP for local call return routing. Assume, for example, that a PCAP attendant located at PCAP location 94A wishes to transfer and return a service call (e.g., from a poisoned party at location 38) to the 911 operator at PSAP 65. In such a situation, the PCAP attendant will key in the ten digit number of the calling or poisoned party and send the same over PRI trunk 97 to service network node or SSP 92A. This step is illustrated by step S.200 in FIG. 7, where a call origination from a PCAP PRI trunk is received at the originating SSP and causes an Off-Hook Delay trigger at the SSP. In addition to sending the ten digit number of the poisoned party, the PCAP attendant may also send the ten digit number of the PCAP location to the SSP. When an Off-Hook Delay trigger is encountered at the originating SSP, a query message is formulated and sent to the ISCP, as represented by step S.204 in FIG. 7. For Off-Hook Delay queries at SSPs equipped as a 5ESS switch, the initial query that is generated may comprise an Info_Collected message, with a trigger criteria type of "PRI B Channel Setup" (i.e., this may be the designation given to PRI Off-Hook Delay triggers in the 5ESS). The query message from such a 5ESS switch may be approximately 114 octets in length and include all of the SS7 protocol layers. For Off-Hook Delay queries at a DMS switch, the initial query that is generated may comprise an Info_Collected message, with a trigger type criteria type of "Off-Hook Delay". This query message from such a DMS switch may be approximately 96 octets in length, and include all of the SS7 protocol layers. In addition, the query message from the DMS switches may be shorter than that from 5ESS switches, since it does not need to include some parameters (e.g., LATA) that are customarily included by the 5ESS switch.

Table 6 illustrates exemplary parameters and parameter values that may be provided in the Off-Hook Delay query message at step S.204 from an originating SSP equipped as a 5ESS or DMS switch. As shown in Table 6, the query message may include a USERID parameter, a CHARGE NUMBER parameter, a TRIGGER CRITERIA TYPE parameter, a CALLING PARTY ID parameter, and a COLLECTED ADDRESS parameter. The USERID parameter may be set to the calling number of the PCAP location, the CHARGE NUMBER parameter may be set to the trunk group billing number, and the TRIGGER CRITERIA TYPE parameter may be set to a value of "PRI B Channel Setup" for 5ESS switches or to "Off-Hook Delay" value for DMS switches. In addition, the CALLING PARTY ID parameter may be set to the calling number of the PCAP location and the COLLECTED ADDRESS parameter may be set to the ten digit number of the poisoned party (i.e., the poison party number (PPN)).

TABLE 6

5ESS AND DMS OFF-HOOK DELAY QUERY MESSAGE

| Parameter | Value |
| --- | --- |
| USERID | PCAP Calling Party Number |
| CHARGE NUMBER | Trunk Group Billing Number |
| TRIGGER CRITERIA TYPE | "PRI B Channel Setup"** |
| CALLING PARTY ID | PCAP Calling Party Number |
| COLLECTED ADDRESS | 10D Poisoned Party Number (PPN) |

**5ESS only. Trigger Criteria Type is "Off-Hook Delay" for DMS

When the query message is received at the ISCP, the appropriate CPR service logic will be accessed and used to determine where the call should be returned. For local call return routing, as shown in FIG. 7, the ISCP will determine based on the NPA-NXX of the poisoned party that the call should be returned to the 911 tandem that is on the same service network node or SSP-that launched the query. That is, a CALLED_NBR field value of "911" (see, for example, Table 5) will be returned from the stand-alone table corresponding to the originating SSP. Thereafter, as represented at step S.208 in FIG. 7, the ISCP will formulate and return a response message. For SSPs implemented as 5ESS or DMS switches, the ISCP may return a response message that is an Analyze_Route message when responding to an Off-Hook Delay query from the SSP. An example of the parameters and parameters values that may be contained in the Analyze_Route response message from the ISCP is provided in Table 7. For local call return routing, the Analyze_Route response message may contain a CHARGE NUMBER parameter, a CALLED PARTY ID parameter, and a PRIMARY TRUNK GROUP parameter. The CHARGE NUMBER parameter that is set to the ten digit poison party number (PPN), and the CALLED PARTY ID parameter may be set to a value of "911". In addition, the PRIMARY TRUNK GROUP parameter may be set to the route index for the MF trunk connecting the SSP to the 911 tandem, as indicated by the RTE_INDX field in the stand-alone table in the ISCP (see, for example, Table 5).

TABLE 7

ISCP "LOCAL" ANALYZE_ROUTE RESPONSE MESSAGE

| Parameter | Value |
| --- | --- |
| CHARGE NUMBER | 10D Poisoned Party Number (PPN) |
| CALLED PARTY ID | "911" |
| PRIMARY TRUNK GROUP | Route index for MF 911 trunk |

After the response message is received from the querying SSP, the SSP will analyze the routing information and complete the call to the 911 tandem via the MF trunk identified in the response message. As represented at step S.212 in FIG. 7, the originating SSP will complete the call to the 911 tandem by outpulsing a 911 digit stream plus an eight digit number of the poisoned party. As noted above, in order to conform with 911 call signalling format, the SSP may automatically delete the NPA from the ten digit PPN, prepend a "0" digit, and outpulse the correct eight digit format to the 911 tandem. In the example discussed above, SSP 92A would return the call from PCAP location 94A to a 911 operator at PSAP 65 via MF trunk 70 and 911 tandem switch 62.

FIG. 8 illustrates an exemplary message flow for remote call return routing. Call return processing is initiated when a call return request, originating from a PCAP attendant, is forwarded to an originating SSP over an appropriate PRI trunk group. Assume, for example, that for the exemplary message flow of FIG. 8, that a PCAP attendant located at PCAP location 94D wishes to return a call initiated by a poison party located at telephone location 38. The PCAP attendant may transfer the call by dialing the ten digit number of the poison party (i.e., the PPN) and sending the PPN over the PRI trunk 97 to the service network node 92D acting as the originating SSP. This step is generally represented at step S.220 in FIG. 8. The trigger in the SSP may be defined according to various schemes. For example, as noted above, a segregated PRI trunk group may be defined and provisioned with an Off-Hook Delay trigger, which is engaged whenever a call is transferred from the PCAP attendant over the segregated PRI trunk to the SSP.

When the call return request is received at the originating SSP, an Off-Hook Delay trigger will be engaged and a query message will be formulated and sent to the ISCP, as shown in step S.224. The query message that is sent at step S.224 may be similar to that described above for local call return routing. That is, the query message for SSPs equipped with 5ESS or DMS Off-Hook Delay triggers may contain similar Parameters and parameter values as that described above with reference to Table 6. The query message may include a USERID parameter, a CHARGE NUMBER parameter, a TRIGGER CRITERIA TYPE parameter, a CALLING PARTY ID parameter, and a COLLECTED ADDRESS parameter. The USERID parameter may be set to the calling number of the PCAP location, the CHARGE NUMBER parameter may be set to the trunk group billing number, and the TRIGGER CRITERIA TYPE parameter may be set to a value of "PRI B Channel Setup" for 5ESS switches or to "Off-Hook Delay" value for DMS switches. In addition, the CALLING PARTY ID parameter may be set to the calling number of the PCAP location and the COLLECTED ADDRESS parameter may be set to the ten digit number of the poisoned party (i.e., the poisoned party number (PPN)).

In the example discussed above, the poisoned party or calling party is served by a 911 tandem switch that is connected to a remote service network node (i.e., service network node or SSP 92A). Therefore, the call should be routed to a 911 tandem that is served by a different SSP node than that which generated the Off-Hook Delay query (i.e., service network node 92D serving PCAP location 94D). The CPR service logic of the ISCP will determine that the call should be returned remotely and, therefore, that the call must first be routed to a virtual number of the remote SSP. As represented at step S.228 in FIG. 8, the ISCP will formulate and return a response message for remote call return routing. The response message at step S.228 may be sent as an Analyze_Route response and include the virtual number to outpulse for the remote SSP. Table 8 illustrates exemplary parameters and parameter values for the Analyze_Route response for remote call return routing. For both 5ESS and DMS switches, the Analyze_Route response to an Off-Hook delay query may include a CALLING PARTY ID parameter that is set to the ten digit poisoned party number (i.e., the PPN) and a CALLED PARTY ID parameter that is set to the ten digit virtual number associated with the remote SSP node. Based on the information contained in the stand-alone table accessed and searched by the ISCP (see, for example, the RTE_INDX field of Table 5), a PRIMARY TRUNK GROUP parameter may be set to the value of the route index for the PRI trunk connecting the originating SSP to the remote SSP node.

TABLE 8

ISCP "REMOTE" ANALYZE_ROUTE RESPONSE MESSAGE

| Parameter | Value |
| --- | --- |
| CALLING PARTY ID | 10D Poisoned Party Number (PPN) |
| CALLED PARTY ID | 10D Virtual Number on remote SSP |
| PRIMARY TRUNK GROUP | Route index for PRI to remote SSP |

The originating SSP will then analyze the response message from the ISCP and route the call to the virtual number on a remote SSP via the PRI trunk indicated in the response message. That is, for the example discussed above, querying service network node 92D will route the call to remote service network node 92A over PRI network 57. Step S.232 in FIG. 8 generally illustrates this step. At step S.232, the originating SSP will route the call via the given office route to the ten digit virtual number contained or identified in the stand-alone table in the ISCP (see, for example, the CALLED_NBR field of Table 5). The PPN may be passed along as the CALLING PARTY ID value for further processing at the remote SSP. At the remote SSP, the ten digit virtual number will cause a ten digit trigger or a virtual TAT trigger to occur at the remote SSP, so that another query message may be sent to the ISCP. For 5ESS switches, a ten digit trigger may be utilized, and for DMS switches a virtual TAT trigger may be utilized. In either case, the ten digit virtual number should be established as the virtual number with the trigger.

As illustrated at step S.236 in FIG. 8, after the trigger is encountered at the remote SSP, a query message will be sent to the ISCP. A 3/6/10D query message may be used for 5ESS switches, and a virtual TAT query message may be used for DMS switches at the remote SSP. For 3/6/10D queries from 5ESS switches, this query may comprise an Info_Analyzed message, with a trigger criteria type of "npaNXXXXXX" (i.e., the form taken by 3/6/10D trigger). The 3/6/10D query message may be approximately 100 octets in length. For virtual TAT query messages from DMS switches, this query may comprise a Termination_Attempt message with a trigger criteria type of "terminationAttempt". The virtual TAT query message may be approximately 107 octets in length.

Tables 9A and 9B contain exemplary parameters and parameter values for 3/6/10D query messages and virtual TAT query messages, respectively. As indicated in Table 9A, the. 3/6/10D query may include a CALLED PARTY ID parameter, a CHARGE NUMBER parameter, a TRIGGER CRITERIA TYPE parameter and a CALLING PARTY parameter. In the 3/6/10D query, the ten digit virtual number may set for the value of the CALLED PARTY ID parameter, and the ten digit poisoned party number (PPN) may be set for the value of the CALLING PARTY ID parameter (see, for example, Table 9A). The virtual TAT query may also include a CALLED PARTY ID parameter, a CHARGE NUMBER parameter, a TRIGGER CRITERIA TYPE parameter and a CALLING PARTY parameter. As shown in Table 9B, in the virtual TAT query the ten digit virtual number may be set as the value of the CALLED PARTY ID parameter and the ten digit poisoned party number (PPN) may be set to the value of the CALLING PARTY ID parameter. For both the 5ESS 3/6/10D query and the DMS virtual TAT query, the CHARGE NUMBER parameter may be set to the trunk group billing number for the PRI trunk identified by the ISCP.

TABLE 9A

5ESS 3/6/10D QUERY MESSAGE FROM REMOTE SSP

| Parameter | Value |
| --- | --- |
| CALLED PARTY ID | 10D Virtual Number on remote SSP |
| CHARGE NUMBER | Trunk Group Billing Number |
| TRIGGER CRITERIA TYPE | "npaNXXXXXX" |
| CALLING PARTY ID | 10D Poisoned Party Number (PPN) |

TABLE 9B

DMS VIRTUAL TAT QUERY MESSAGE FROM REMOTE SSP

| Parameter | Value |
| --- | --- |
| CALLED PARTY ID | 10D Virtual Number on remote SSP |
| CHARGE NUMBER | Trunk Group Billing Number |
| TRIGGER CRITERIA TYPE | "terminationAttempt" |
| CALLING PARTY ID | 10D Poisoned Party Number (PPN) |

Following step S.236 in FIG. 8, the CPR service logic in the ISCP will-determine-that the call should be routed to a 911 tandem served by the remote SSP. As a result, a response message will be formulated and returned at step S.240 to the remote SSP via one of the CCS links. That is, in the example noted above, ISCP 10 will return a response message to the remote service network node 92A to indicate that the call may be returned to a 911 operator at PSAP 65. The response message from the ISCP for remote call return routing may comprise an Analyze_Route message and may be approximately 70 octets in length. Table 10 illustrates exemplary parameter and parameter values that may be provided as part of the Analyze_Route response message for queries from 5ESS switches. For a DMS virtual TAT query, the response message may comprise a Forward_Call message. The Forward_Call response message may also be 70 octets in length, and may comprise values similar to the Analyze_Route response message indicated in Table 10.

TABLE 10

ISCP ANALYZE_ROUTE (5ESS) AND FORWARD_CALL (DMS) RESPONSE MESSAGE TO REMOTE SWITCH QUERIES

| Parameter | Value |
| --- | --- |
| CHARGE NUMBER | 10D Poisoned Party Number (PPN) |
| CALLED PARTY ID | "911" |
| PRIMARY TRUNK GROUP | Route index for MF 911 trunk |

As shown in Table 10, the Analyze_Route and Forward_Call response messages may include a CHARGE NUMBER parameter, a CALLED_PARTY ID parameter, and a PRIMARY TRUNK GROUP parameter. The CALLED PARTY ID parameter may be set to a value of "911", and the CHARGE NUMBER parameter may beset to the ten digit poisoned party number (i.e., PPN). In addition, the PRIMARY TRUNK GROUP parameter may be set to the route index for the MF link 70 identified for connecting the remote SSP to the 911 tandem. When the response message is sent, the remote SSP will analyze the routing information contained in the response message and will complete the call to the 911 tandem, as represented at step S.244 in FIG. 8. When completing the call to the 911 tandem, the remote SSP may outpulse the 911 digit stream and an eight digit poisoned party number. Once again, the eight digit poisoned party number may be automatically formatted by the remote SSP by removing the NPA from the full ten digit poisoned party number and appending "0" digit to the remaining seven digit number of the poisoned party.

While the invention has been described with reference to several exemplary embodiments, it is understood that the words which have been used herein are words of description and illustration, rather than words of limitations. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

The invention claimed is:

1. A computer readable medium for storing a computer program that returns a service by a calling party to a service network having a plurality of service network locations, comprising:
   a call return request receiving code segment that receives an indication of a call return request initiated by one of said service network locations;
   a location determining code segment that determines a location of said calling party;
   a service answering point identifying code segment that identifies, based on the location of said calling party, one of a plurality of service answering points for receiving said call return request, and identifies routing information for routing said call return request to said receiving service answering point; and
   a completing code segment that provides instructions to complete said call return request to said receiving service answering point.

2. The computer readable medium according to claim 1, further comprising a local routing determining code segment that determines when said call return request can be routed locally to said receiving service answering point.

3. The computer readable medium according to claim 2, further comprising a local routing identifying code segment that identifies local routing information to be included as part of said routing information when it is determined that local routing can be performed, and that identifies remote routing information to be included as part of said routing information when it is determined that remote routing must be performed.

4. The computer readable medium according to claim 3, wherein said local routing information comprises a route index and a predefined emergency assistance number to be outpulsed, said program further comprising a service call returning code segment that returns said service call to said receiving service answering point based on the route index and the emergency assistance number contained in said routing information.

5. The computer readable medium according to claim 4, wherein said emergency assistance number comprises 911.

6. The computer readable medium according to claim 3, wherein said remote routing information comprises a route index and a predefined virtual number to be outpulsed, said service call being routed over said service network based on the route index and the virtual number contained in said routing information.

7. The computer readable medium according to claim 1, wherein said location of said calling party is determined based on a Number Plan Area (NPA) and a Central Office Code (NXX) of a calling number of said calling party.

8. The computer readable medium according to claim 1, further comprising a number outpulsing code segment that outpulses a number corresponding to one of a plurality of NPA-NXX entries present in a stand-alone table, for routing said call return request to said receiving service answering point.

9. The computer readable medium according to claim 1, wherein said service network comprises an emergency service network and said service network locations comprise emergency answering points that are adapted to provide assistance and counseling to calling parties regarding emergencies.

10. The computer readable medium according to claim 9, wherein said emergency service network comprises a Primary Rate Interface (PRI) network.

11. A method for returning a service call placed by a calling party to a service network having a plurality of service network locations, comprising:
    receiving an indication of a call return request initiated by one of said service network locations;
    determining a location of said calling party;
    identifying, based on the location of said calling party, one of a plurality of service answering points for receiving said call return request, and identifying routing information for routing said call return request to said receiving service answering point; and
    providing instructions to complete said call return request to said receiving service answering point.

12. A system for returning a service call placed by a calling party to a service network having a plurality of service network locations, comprising:
    a receiver that receives an indication of a call return request initiated by one of said service network locations;
    a determiner that determines a location of said calling party;
    an identifier that identifies, based on the location of said calling party, one of a plurality of service answering points for receiving said call return request, and identifies routing information for routing said call return request to said receiving service answering point; and
    an instructor that provides instructions to complete said call return request to said receiving service answering point.

* * * * *

UNITED STATES PATENT AND TRADEMARK OFFICE
CERTIFICATE OF CORRECTION

PATENT NO. : 7,499,536 B2 Page 1 of 1
APPLICATION NO. : 10/936553
DATED : March 3, 2009
INVENTOR(S) : Boeckman et al.

It is certified that error appears in the above-identified patent and that said Letters Patent is hereby corrected as shown below:

On the Title Pg, References Cited Item (56), U.S Patent Documents, add --5,878,126 4/1996 Moore et al.--

Signed and Sealed this

Twenty-ninth Day of September, 2009

David J. Kappos
*Director of the United States Patent and Trademark Office*